US010140736B2

(12) United States Patent
Doran et al.

(10) Patent No.: US 10,140,736 B2
(45) Date of Patent: Nov. 27, 2018

(54) GRAPHICS PROCESSING SYSTEMS

(71) Applicants: ARM Limited, Cambridge (GB); Geomerics Limited, Cambridge (GB)

(72) Inventors: Christopher John Leslie Doran, Cambridge (GB); Richard Callum Baird Evans, Cambridge (GB); Wasim Abbas, Cambridge (GB); Roberto Lopez Mendez, Cambridge (GB)

(73) Assignee: Arm Limited, Cambridge (GB)

( * ) Notice: Subject to any disclaimer, the term of this patent is extended or adjusted under 35 U.S.C. 154(b) by 116 days.

(21) Appl. No.: 15/226,538

(22) Filed: Aug. 2, 2016

(65) Prior Publication Data

US 2017/0039739 A1 Feb. 9, 2017

(30) Foreign Application Priority Data

Aug. 3, 2015 (GB) .................................. 1513675.7

(51) Int. Cl.
*G06T 11/20* (2006.01)
*G06T 1/20* (2006.01)
*G06T 17/00* (2006.01)
*G06T 11/40* (2006.01)

(52) U.S. Cl.
CPC .............. *G06T 11/203* (2013.01); *G06T 1/20* (2013.01); *G06T 11/40* (2013.01); *G06T 17/00* (2013.01)

(58) Field of Classification Search
None
See application file for complete search history.

(56) References Cited

U.S. PATENT DOCUMENTS

2007/0097123 A1 5/2007 Loop et al.
2010/0097383 A1* 4/2010 Nystad ................. G06T 11/203 345/442

FOREIGN PATENT DOCUMENTS

GB 2463992 4/2010
GB 2464382 4/2010

OTHER PUBLICATIONS

GB Combined Search and Examination Report dated Jan. 27, 2016, GB Patent Application GB1513675.7.

(Continued)

*Primary Examiner* — David H Chu
(74) *Attorney, Agent, or Firm* — Vierra Magen Marcus LLP

(57) ABSTRACT

A graphics processing system for generating a render output using an input curve defined in a world space includes processing circuitry configured to determine a portion of a canonical curve defined in canonical space that corresponds to the input curve and the transformation needed to map the input curve to the portion of the canonical curve. For sampling points in the world space surrounding the input curve, the processing circuitry is configured to transform the sampling points from the world space to the canonical space using the determined transformation between the world space and the canonical space; and determine, in the canonical space, the closest point on the determined portion of the canonical curve to the transformed sampling point. The system also includes processing circuitry capable of using the determined closest points on the canonical curve for the transformed sampling points in the canonical space when generating a render output.

14 Claims, 10 Drawing Sheets

(56) References Cited

OTHER PUBLICATIONS

Kilgard, “A Simple OpenGL-based API for Texture Mapped Text”, ftp://ftp.sgi.com/opengl/contrib/mjk/tips/TexFont/TexFont.html, 1997.
Green, “Improved Alpha-Tested Magnification for Vector Textures and Special Effects”, Proceeding SIGGRAPH ’07 ACM SIGGRAPH 2007 courses.
Gustavson, “2D Shape Rendering by Distance Fields”, OpenGL Insights: OpenGL, OpenGL ES, and WebGL community experiences, ed. Patrick Cozzi, Christophe Riccio, ISBN: 978-1-4398-9376-0, 2012.
Loop et al, “Resolution Independent Curve Rendering using Programmable Graphics Hardware”, Proceeding SIGGRAPH ’05 ACM SIGGRAPH 2005.
Loop et al, “Rendering Vector Art on the GPU”, https://developer.nvidia.com/gpugems/GPUGems3/gpugems3_ch25.html, GPU Gems 3, ed. Hubert Nguyen, ISBN-13: 978-0-321-51526-1, 2007.
Kokojima et al, “Resolution independent rendering of deformable vector objects using graphics hardware”, Proceeding SIGGRAPH ’06 ACM SIGGRAPH 2006 sketches, 2006.
Kilgard et al, “GPU-accelerated Path Rendering”, SIGGRAPH Asia a2012, Computer Graphics Proceedings, Annual Conference Series, 2012.
Cairo Graphics Library, http://cairographics.org/, 2014.
Microsoft Direct2D, https://msdn.microsoft.com/en-us/library/windows/desktop/dd370990(v=vs.85).aspx, 2016.
Skia, https://code.google.com/p/skia/, downloaded Aug. 2, 2016.
Windows Advanced Rasterization Platform, https://msdn.microsoft.com/en-us/library/windows/desktop/gg615082(v=vs.85).aspx, 2016.
OpenVG, https://www.khronos.org/openvg/, 2016.
Glyphy library, https://www.youtube.com/watch?v=KdNxR5V7prk, 2014.
Saffron, http://www.ronaldperry.org/SaffronWebPage/, 2007.
Apple Quartz, https://developer.apple.com/library/mac/documentation/GraphicsImaging/Conceptual/drawingwithquartz2d/Introduction/Introduction.html, 2014.

* cited by examiner

GRAPHICS PROCESSING SYSTEMS

BACKGROUND

The technology described herein relates to graphics processing systems and in particular to the rendering of images using smooth shapes, such as smooth curves, in graphics processing systems.

It is becoming increasingly desirable in graphics processing systems to be able to render smooth shapes, and in particular shapes that are defined by smooth curves (that have a smooth curve as their edge or boundary), effectively and accurately for display. In general a shape with an edge or boundary curve that is continuous and where the first derivative of the curve is piecewise continuous can be considered to be a smooth shape (a shape defined by a smooth curve) from the point of view of graphics processing (and will be considered to be a smooth shape and, correspondingly, a smooth curve, for the purposes of the technology described herein and present application). Examples of such smooth curves in graphics processing are Bezier curves, spline curves and arcs.

In recent years it has become increasingly common to use vector graphics in computer graphics. As is known, in the art, one key advantage of vector graphics over raster graphics is the ability to provide resolution-independent images, i.e. images that can essentially be scaled indefinitely without degrading. For example, the individual characters (glyphs) in computer fonts, such as TrueType™, are typically stored as vector images.

Vector graphics are based on the use of individually defined geometrical objects, and are typically described by one or more line segments, e.g. straight lines or curves (such as quadratic (e.g. Bezier) curves, elliptical arcs, cubic (e.g. Bezier) curves) that are connected together at anchor points to form a path.

Vector graphics objects/paths are defined and manipulated in a space, commonly known as "world space". In order to output the vector graphics objects/paths to a video display or printer, however, the objects/paths as defined in world space need to be converted into a suitable form so as to be displayed on a screen or to be outputted on a printer. This conversion typically involves projecting the objects/paths as defined in world space to another space, commonly referred to as "surface space", that corresponds to the perspective (geometry) of the output display on which the objects/paths are to be viewed. The transformation between world space and surface space is typically referred to as the "world-to-surface transformation".

Once the vector graphics objects/paths have been converted into surface space representations, they are then rendered, which may use a pre-computed representation of the objects and/or paths.

One method for converting the vector graphics objects/paths into a pre-computed representation which can then be used to render the object or path, e.g. in surface space, is to use a signed distance field, e.g. stored in a texture, which can then be sampled when rendering the object. A signed distance field contains an array of points, e.g. texels, for which the closest distance to the path or the edge of the object is stored for each point, with the sign of the distance denoting whether the point is within or outside the object to be rendered. Sampling the signed distance field therefore determines whether a sampling point falls within or outside the object to be rendered.

Signed distance fields aid the rendering of such objects, e.g. glyphs for fonts, and allow techniques such as anti-aliasing to be used. However, the calculation of the signed distance field from the vector graphics objects/paths, e.g. using scan-line rasterisation, is complicated. Also, if the object or path needs to be scaled, then the signed distance field may need to be re-calculated at the new resolution, because the signed distance field may only have been stored at a limited resolution. Furthermore, when rendering more complicated objects, e.g. glyphs for fonts which may comprise multiple curve segments, the use of signed distance fields has been found to result in a loss of detail in the rendered object, e.g. the smoothing of sharp corners, owing to artefacts in the method used to calculate the signed distance field. It is thus computationally expensive to calculate this in real time, or requires a lot of space to store the pre-calculated signed distance field offline. This may introduce latencies into the rendering of such objects/paths, which may be desired to perform in real time, e.g. for dynamic web pages.

The Applicants believe therefore that there remains scope for improved techniques and systems for rendering smooth curves and shapes defined by smooth curves.

BRIEF DESCRIPTION OF THE DRAWINGS

A number of embodiments of the technology described herein will now be described by way of example only and with reference to the accompanying drawings, in which:

FIG. 7 shows a graphical representation of a signed distance field for each of the glyphs in a font represented graphically as a texture atlas for use with an embodiment of the technology described herein.

DETAILED DESCRIPTION

Figure 1:
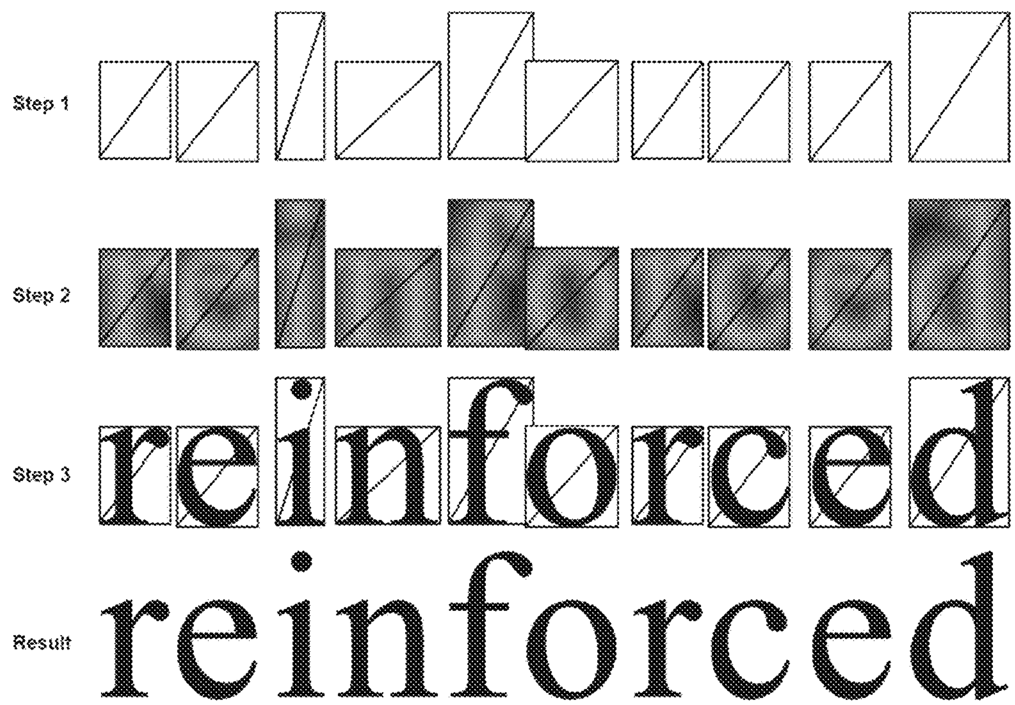
FIG. 1 shows an overview of the workflow for rendering a string of text according to an embodiment of the technology described herein.

One embodiment of the technology described herein comprises a method of generating a render output using an input curve in a graphics processing system comprising:

for an input curve defined in a world space:

determining a portion of a canonical curve defined in a canonical space that corresponds to the input curve and the transformation needed to map the input curve to the portion of the canonical curve;

for each of a plurality of sampling points in the world space surrounding the input curve:

transforming the sampling point from the world space to the canonical space using the determined transformation between the world space and the canonical space; and determining, in the canonical space, the closest point on the determined portion of the canonical curve to the transformed sampling point;

to thereby determine, for each of the transformed sampling points in the canonical space surrounding the canonical curve, a corresponding closest point on the canonical curve in the canonical space; and using the determined closest points on the canonical curve for the transformed sampling points in the canonical space when generating a render output.

Another embodiment of the technology described herein comprises a graphics processing system for generating a render output using an input curve, the graphics processing system comprising:

processing circuitry configured, for an input curve defined in a world space, to:

determine a portion of a canonical curve defined in a canonical space that corresponds to the input curve and the transformation needed to map the input curve to the portion of the canonical curve;

for each of a plurality of sampling points in the world space surrounding the input curve, to:

transform the sampling point from the world space to the canonical space using the determined transformation between the world space and the canonical space; and determine, in the canonical space, the closest point on the determined portion of the canonical curve to the transformed sampling point;

to thereby determine, for each of the transformed sampling points in the canonical space surrounding the canonical curve, a corresponding closest point on the canonical curve in the canonical space; and processing circuitry configured to use the determined closest points on the canonical curve for the transformed sampling points in the canonical space when generating a render output.

In the technology described herein, the render output is generated using an input curve by first mapping the input curve defined in a "world space" (which may be flat and thus only have two dimensions, or it may be a three dimensional space) to a corresponding predefined "canonical" curve that has been defined in a "canonical space". Then, positions in the canonical space, transformed from corresponding positions in the world space surrounding the input curve, are sampled (tested) to determine the closest point on the canonical curve to each of the sampling positions. These closest points, are used to generate the render output. This information can be used, for example, to render shapes, e.g. glyphs for a font, for which the input curve forms at least a part of their outline, or render lighting or shadows based on an object for which the input curve forms at least a part of their outline.

The Applicants have, however, recognised that all curves within certain families of curves can be transformed, e.g. using only rotation, translation and uniform scaling, onto at least a portion of a predefined, single or fundamental curve, referred to herein as a "canonical curve".

This therefore allows information about a single curve, i.e. the canonical curve, to be used to determine information about one or more input curves that are used by the graphics processing system for using in generating the render output. In other words, instead of, for example, having to derive or store data in relation to each individual input curve that is used by the graphics processing system to be rendered, it is only necessary to derive or store data about the canonical curve. This data can then be used to generate the render output using each of the individual input curves that belong to the family (set) of input curves that the "canonical curve" represents.

Thus, not only can the technology described herein comprise a more efficient mechanism for generating a render output using one or more input curves, it comprises a particularly convenient mechanism for doing so. For example, once the canonical curve in the canonical space has been defined, it may be possible to refer to points on the curve (and thus use these in calculations) simply by a single coordinate, e.g. the x coordinate. Thus, using canonical curves to determine the closest point on the curve to a sampling point, which in turn may be used to determine the distance to the closest point on the curve (part of the information in a signed distance field), allows the mathematical representation of the input curve, e.g. defined using vector graphics, to be retained. This is a simpler and more accurate way of determining this information which thus increases the speed and accuracy of generating the render output using the input curve. This compares to techniques using signed distance fields that are evaluated using scan-line rasterisation, which lead to a loss of information when calculating the signed distance field, and thus a loss of detail in the render output.

A simpler process for generating a render output using such input curves, may help to reduce the processing and power load for the device running the process, and thus may allow it to be used on simpler devices, e.g. mobile and wearable devices, which are battery operated and may not implement multi-functional processing. Alternatively the increased efficiency of the process may allow it to perform more sophisticated rendering features, or be able to (re-) calculate the necessary information (e.g. the closest point on the canonical curve to each of the transformed sampling points) in real time when needed, without an associated increase in the processing and power load for the device compared to previous techniques.

For the generation of the render output when using such an input curve, particularly when rendering fonts, using a simpler and more accurate process (e.g. an analytical calculation of the closest point on the canonical curve for a transformed sampling point), allows fonts to be presented more attractively on displays, particularly when the text is magnified such that the fonts may need to be recalculated.

The input curve defined in the world space that is used by, e.g. is the input to, the process of the technology described herein may be the input curve as initially defined by, e.g., the application that requires the render output to be generated using the input curve. However, it would also be possible for the input curve to be a curve that is derived from another curve that is defined in the world space. For example, it is also contemplated that the input curve may have been derived by transforming another or initial curve into the world space from another space in which it is, e.g. received, by the technology described herein.

The input curve may be input into the graphics processing system in any suitable and desired way. For example, the input curve may be (pre-)stored in the graphics processing system, allowing it to be read from its stored location, or the input curve may be determined by the graphics processing system itself. In another embodiment the input curve may be positively input, e.g. by the application that requires the render output to be generated using the input curve. In an embodiment the method comprises the step of (and the processing circuitry is configured to) receiving the input curve.

The render output, e.g. containing a shape to be rendered using the input curve, may be generated using only a single curve, e.g. having a single definition (e.g. mathematical formula) for the whole of its length (or at least the portion of its length that is to be used to generate the render output). In an embodiment the input curve has a form for which there can be derived a "canonical curve" having the properties as described above. Thus, the input curve used by the graphics processing system may be any curve from a family of curves that can have an appropriate associated canonical curve.

One family of curves that can have an associated canonical curve of this form are quadratic curves. In this case the canonical curve can be the fundamental quadratic curve, i.e. a curve of the form $y=x^2$. Accordingly, in one embodiment, the input curve in world space received by the graphics processing system is a quadratic curve.

It is equally contemplated that the render output may be generated using a plurality of input curves, e.g. multiple curve segments each having a different definition (e.g. mathematical formula) over their length. For example, a glyph for a font will typically be defined by multiple curve segments (which may include straight line segments) that together form the outline of the glyph.

Also or instead the input curve may not have a corresponding curve in canonical space, and thus it may be possible to sub-divide that initial curve into a plurality of curve sections or segments which do each have corresponding canonical curves (which are members of a family of curves that has an associated canonical curve), e.g. the input curve to be used in the render output may be derived by sub-dividing an initial curve that is defined in the world space into two or more separate input curves (e.g. being defined as separate input curves for different sections along the length of the initial curve). For example, a cubic or elliptical curve may be sub-divided into a plurality of quadratic curves. This would accordingly allow the technology described herein to be used to render curves for which there may not be a directly corresponding canonical curve directly defined (and/or stored) or available.

In these embodiments the method may comprise the step of (and the processing circuitry may be configured to) sub-dividing an initial curve defined in the world space into a plurality of input curves, with one or more of the input curves then each being processed and the render output generated in the manner of the technology described herein. For some initially defined curves, e.g. cubic Bezier curves, when sub-dividing the initial curve into a plurality of input curves, it may be possible to re-use some of the calculations (and thus the processing circuitry may be configured to do this) in order to find the multiple input curves, e.g. quadratic Bezier curves, which provide the best fit to the initial curve. For example, a quadratic Bezier is defined by its start and end points, and the gradients (which can be defined by a third control point). These parameters can then be compared to the corresponding parameters for adjacent Beziers, e.g. in a standard form, to determine when they can be merged.

In a set of embodiments, when the render output is to be generated using multiple input curves, the method of the technology described herein is repeated for each of the input curves (e.g. segments), e.g. each input curve (segment) is transformed into the canonical space where it is determined, for each of a plurality of sampling points in the world space surrounding the input curve (segment), the closest point on the determined portion of the canonical curve to the transformed sampling point. This then returns the determined closest point on the canonical curve (segment) for each transformed sampling point, for an array of transformed sampling points surrounding each of the multiple canonical curves, and these determined closest points can then be used when generating the render output.

The Applicants have recognised that in practice many input curves that it may be desired to use when generating the render output will fall into one of a few families of curves, and so it is possible to represent many of the curves that it may ever be desired to draw, e.g. to define complex shapes such as fonts, using relatively few input curves. The input curve may be any suitable curve or curves. In one embodiment the input curve is a smooth curve. In an embodiment each smooth curve is a curve that is continuous and for which the first derivative of the curve (of the path of the curve) is piecewise continuous. In an embodiment the input curves are a straight line, a (e.g. quadratic or cubic) Bezier curve, a spline curve and/or an (e.g. elliptical) arc.

However, as will be discussed further below, the input curves may comprise more complicated curves, e.g. an ellipse and/or a hyperbola, which may not need the curve to be sub-divided into a plurality of quadratic curves, for example. However, for input curves defined in this way there is not a unique transformation (in two dimensions) from the world space into the canonical space and so the definition of the curve may need to comprise further information such as the eccentricity of the curve, e.g. represented as a third dimension in the canonical space. This may be stored as part of the input curve's definition or the method may comprise the step of (and the processing circuitry may be configured to), when the input curve comprises an ellipse or a hyperbola, determining the eccentricity of the input curve.

When the input curves comprise ellipses and hyperbolae, along with quadratics for example, this provides a useful toolbox to a user for defining complex shapes to use when generating a render output, which can be transformed from one or more input curves to corresponding canonical curves, e.g. only by rotations, scaling and translations, which is relatively hardware-friendly.

The input curve that is defined in world space that is used by, e.g. received as an input to, the process of the technology described herein may be defined in any desired and suitable manner. For example, the graphics processing system may receive information defining the input curve such as the position of the curve and any parameters relating to the curve. In an embodiment the input curve has a finite length, e.g. as part of a shape, and therefore in an embodiment the definition of the input curve, and thus the information used, e.g. received, by the graphics processing system, comprises the end points of the input curve. As an input curve can be transformed to a corresponding canonical curve using only rotation, translation and uniform scaling, then, as will be discussed further below, that allows the portion of the canonical curve that corresponds to the input curve, such as its start and end points, to be readily determined in use.

In an embodiment the input curve is defined by the position of a plurality of control points in world space, typically comprising a start point, an end point and one or more intermediate points, together with an indication of the type of curve to be drawn between the start and end control points. For example, as discussed above the input curve comprises one of: a straight line, a quadratic Bezier curve (requiring a single intermediate control point), a cubic Bezier curve (requiring two intermediate control points), a spline curve and an (e.g. elliptical or hyperbolic) arc. The definition of the input curve may also comprise the gradient of the curve, e.g. at one or more of the control points. For example a quadratic Bezier curve may be defined by three control points, or by two (end) control points and the gradients at these two control points.

Thus, in an embodiment, the definition of the input curve comprises a plurality of control points in the world space and information indicating the type of curve. Also, when the input curve is received by the graphics processing system, in an embodiment the step of receiving an input curve defined in the world space comprises (and the processing circuitry is configured to) receiving the position of a plurality of control points in the world space and information indicating the type of curve.

For an input curve to be used for generating the render output, e.g. once the input curve has been received by the graphics processing system, it is then necessary to determine the corresponding portion of the canonical curve in the canonical space that represents the input curve. This determination may be carried out in any suitable and desired manner.

In one embodiment this is done by determining the transformation needed to take the input curve as defined in the world space and place it on the corresponding portion of the canonical curve in the canonical space. As discussed above this transformation (the world-to-canonical transformation) should only require rotation, translation and/or uniform scaling. Accordingly, in an embodiment, the step of determining the transformation that transforms the input curve in the world space onto the appropriate portion of the canonical curve comprises (and, in an embodiment, the processing circuitry is configured to) determining a rotation component, if any, of the transformation.

The rotation component of the transformation may be determined in any suitable and desired manner. In an embodiment, however, and again when the input curve in the world space (and thus the canonical curve in the canonical space) is a quadratic curve, the rotation component of the transformation is determined by determining the rotation necessary to make the axis of symmetry of the input curve parallel to the axis of symmetry of the canonical curve in the canonical space. This rotation thus aligns the symmetry axis of the input curve with the direction of the symmetry axis (e.g. the y-axis in the canonical space) of the canonical curve.

In an embodiment, the step of determining the transformation that transforms the input curve in the world space onto the appropriate portion of the canonical curve in the canonical space similarly comprises (and, in an embodiment, the processing circuitry is configured to) determining a translation component, if any, of the transformation.

The translation component of the transformation may also be determined in any suitable and desired manner. In an embodiment, however, and when the input curve (and thus the canonical curve) is a quadratic curve, the translation component of the transformation is determined by determining the translation needed to move the nadir of the input curve of the input curve in the world space onto the nadir of the canonical curve in the canonical space, e.g. at the origin of the canonical space. Thus, in an embodiment, the step of determining the translation component of the transformation, when necessary, follows the step of determining the rotation component of the transformation, when necessary.

Thus, in an embodiment, the step of determining the translation component of the transformation comprises (and, in an embodiment, the processing circuitry is configured to) determining the translation needed to map the nadir of the input curve onto the nadir of the canonical curve in the canonical space.

In an embodiment, the step of determining the transformation that transforms the input curve in world space onto the appropriate portion of the canonical curve similarly comprises (and, in an embodiment, the processing circuitry is configured to) determining a uniform scaling component, if any, of the transformation.

The uniform scaling component of the transformation can also be determined in any suitable and desired manner. In an embodiment, however, and again when the input curve in the world space (and thus the canonical curve in the canonical space) is a quadratic curve, the uniform scaling component of the transformation is determined by determining the scaling factor needed to scale the, e.g. rotated and/or translated, input curve to the canonical curve, e.g. by examining the quadratic form of the input curve.

The steps of determining the rotation, translation and uniform scaling components of the transformation can be performed in any order as desired. In an embodiment of the technology described herein, however, the rotation component is determined first, followed by the translation component, and finally the uniform scaling component.

When the input curve has a finite length, e.g. defined by start and end points, once the transformation needed to map the input curve in the world space to the canonical curve in the canonical space has been determined, in an embodiment the portion of the canonical curve that corresponds to the input curve is determined by using the determined transformation to determine the two positions on the canonical curve that correspond to the start and end points of the centre curve of the input curve. This then gives the location of the input curve in the canonical space.

Once the canonical curve in the canonical space corresponding to the input curve in the world space has been determined, and thus also the transformation from the world space to the canonical space for the input curve, each of a plurality of sampling points in the world space surrounding the input curve can be transformed into corresponding points in the canonical space using the same transformation (either individually or together).

The plurality of sampling points surrounding the input curve may be chosen in any suitable and desired way, e.g. to allow the determined closest points on the input curve to be provided at a level of resolution sufficient for the level of detail at which the render output is desired to be rendered (or to cover most anticipated levels of scaling of the render output to be generated). Alternatively the closest points on the input curve may be determined at a low resolution, e.g. for a small number of sampling points, and then determined at a higher resolution (i.e. in more detail) when necessary later, e.g. when the render output is desired to be generated at a magnified level. In one embodiment a bounding box surrounding the input curve is drawn within which the plurality of sampling points surrounding the input curve are defined.

In one embodiment, the closest point on the canonical curve may not be determined for every sampling point surrounding the input curve for which information relating to the input curve is ultimately to be determined for use when generating the render output. For example, information to be determined for each of a plurality of further sampling points may be inferred from one or more of the (initially defined) sampling points which lie, e.g. close to, a sampling point from the plurality of further sampling points, without having to transform each of these further sampling points into the canonical space and determine the closest point on the canonical curve.

In this embodiment, it may be possible to determine one or more of: the closest point on the curve to a sampling point, the distance from the sampling to the closest point on the curve and the side of the curve on which the sampling point should be treated as being. This information may be determined in the canonical space (and thus may require the sampling points to be transformed into the canonical space and/or the information determined in the canonical space to be transformed back into the world space) or in the world space.

Furthermore, in this embodiment, it may not be necessary to determine the actual value of a particular variable using one or more nearby sampling points, but determine when the value of a variable is above or below a threshold. This may then be used to determine when it is necessary to determine the value of the variable independently or more accurately, e.g. for sampling points lying close to the input curve. For example, for a further sampling point, it may be possible to determine, using one or more surrounding sampling points for which the closest point and/or the distance has already been determined, when the further sampling point is closer or further away than a nearby sampling point. When the further sampling point is further away, it may be sufficient to simply store the distance to the curve for the nearby sampling point (or a threshold or default value indicating that this point is further away). When the further sampling point is closer, it may be necessary to determine the closest point on the curve for this sampling point in the canonical space as for the initial set of sampling points.

In this embodiment, the information determined for the initial set of sampling points, e.g. one or more of the closest point on the curve to a sampling point, the distance from the sampling to the closest point on the curve and the side of the curve on which the sampling point may be treated as being, is stored, e.g. in a cache, to allow these comparisons to be made for the further sampling points.

When there are a plurality of input curves, the plurality of sampling points in the world space surrounding each input curve could be the same for each input curve, e.g. they could surround all the input curves (and thus could give the possibility of testing against all the input curves when rendering, as will be discussed below), but in an embodiment the plurality of sampling points surrounding each input curve are chosen separately for each input curves, e.g. to just surround the input curve, and thus in an embodiment they form a sub-set of the sampling points in the world space. For example, a (single) bounding box could be drawn to surround all the input curves, but in an embodiment a separate bounding box is drawn to surround each input curve, within which a plurality of sampling points is defined.

For a sampling point in the world space transformed into the canonical space, the closest point on the canonical curve to the transformed sampling point in the canonical space may be determined in any suitable and desired way. In an embodiment the closest point on the canonical curve to each of the transformed sampling points is determined analytically in the canonical space. The closest point may be determined by determining the point on the canonical curve at which the tangent to the canonical curve is perpendicular to the vector from the transformed sampling point to the point on the canonical curve. (For some canonical curves this may return more than one point on the curve which satisfies this condition, so the distances from the transformed sampling point to the points on the curve may need to be compared to determine the closest point, e.g. to discard points which fall outside the finite portion of the canonical curve and/or to choose the point on the canonical curve with the shortest distance from the transformed sampling point.) Depending on the definition of the input curve, such an analytical calculation may not possible in the world space, e.g. when the input curve is defined as a Bezier curve, but may be possible in the canonical space, e.g. when the corresponding canonical curve is a parabola.

When the input curve has a finite length, e.g. defined by start and end points, the start or end point of the portion of the canonical curve may be closer than the (closest) point on the canonical curve (e.g. outside of the portion) at which the tangent to the canonical curve is perpendicular to the vector from the transformed sampling point to the point on the canonical curve, e.g. the start or end point of the curve may be the closest point on the curve to the sampling point. Thus in an embodiment the step of determining the closest point on the canonical curve to a transformed sampling point also comprises (and thus in an embodiment the processing circuitry is configured to) determining the distances from the transformed sampling point to the start and the end points of the portion of the canonical curve and determining when one of the start or the end point is the closest point on the canonical curve to the transformed sampling point.

In an embodiment the step of determining the closest point on the canonical curve to a particular transformed sampling point comprises (and thus in an embodiment the processing circuitry is configured to) determining the distance between the transformed sampling point and the closest point on the canonical curve to the transformed sampling point in the canonical space, e.g. the step of determining the closest point on the canonical curve to the transformed sampling point in the canonical space may comprise minimising the distance between a given transformed sampling point and the canonical curve. This thereby determines, for each of the sampling points surrounding the curve, the distance from the sampling point to the corresponding closest point on the curve for the sampling point, and allows the distance to the closest point on the curve be used when generating the render output, e.g. as part of a signed distance field, without having to calculate this value again in the world space when generating the render output.

The distance between the transformed sampling point and the closest point on the canonical curve may be determined using a lookup table. Alternatively the distance between the transformed sampling point and the closest point on the canonical curve may be calculated analytically, e.g. as an analytic computation baked into hardware. When a lookup table is to be used, this may be provided over a particular (e.g. limited) range of the canonical curve (e.g. in order to minimise the amount of data stored in the lookup table, as many of the input curves will correspond to portions of the canonical curve close to the nadir of a parabola), with an analytical calculation being performed outside of this range. Furthermore, a plurality of lookup tables may be used, e.g. covering different portions of the canonical curve, with the distances from a plurality of sampling points determined and stored in advance, for use as required. This helps to reduce the need to recalculate these distances and thus reduces the real time processing.

In a further embodiment, in addition to the lookup tables, e.g. stored in a texture, being provided to determine the distance from a sampling point to the closest point on the curve, the canonical curve corresponding to the input curve (and, for example, also including the determined transformation from the world space to the canonical space) may also be determined and stored in advance. Further information, e.g. the formulae for use in determining the distance from a sampling point to the closest point on the curve and/or the maximum extent of an input curve or curves (e.g. by defining a bounding box around the input curve(s) within which the sampling points may be defined), may also be determined and stored in advance as is suitable and desired.

For example, when the input curve(s) define a glyph to be rendered, the font format may contain some or all of this information.

When the input curve is a straight line, in an embodiment the input curve in the world space is transformed onto an axis, e.g. the x-axis, in the canonical space, e.g. using one or more of a rotation, a translation and a scaling, as is required. The closest point on the canonical curve is then simply the, e.g. x, coordinate of the transformed sampling point along the axis onto which the straight line has been transformed. When the input curve has a finite length, e.g. defined by start and end points, the closest point on the canonical curve to the transformed sampling point is the x coordinate of the transformed sampling point when the, e.g. x, coordinate of the transformed sampling point lies between the, e.g. x, coordinates of the start and end points of the canonical curve. When the, e.g. x, coordinate of the transformed sampling point lies outside the start and end points of the canonical curve, the closest point on the canonical curve to the transformed sampling point is the closer of the start or the end points to the transformed sampling point. For such an input curve having a finite length, the straight line segment in the canonical space could be scaled to run between x=0 and x=1 in the canonical space, but this is not necessary.

Once the closest point on the canonical curve to a transformed sampling point has been determined in the canonical space, the closest point may be transformed from the canonical space to the world space, e.g. using the inverse of the transformation between the world space and the canonical space determined for the input curve. Thus the method may comprise the step of (and the processing circuitry may be configured to), for each of the plurality of sampling points: transforming, using the inverse of the transformation between the world space and the canonical space, the determined closest point from the canonical space into the world space; to thereby determine, for each of the sampling points in the world space surrounding the input curve, a corresponding closest point on the input curve in the world space. The step of generating a render output may then use the determined closest points on the input curve for the sampling points in the world space when generating the render output. However, as described below, this may not be necessary, as use of the determined closest points, e.g. to determine the distance from a sampling point to the curve and/or to determine on which side of the curve a sampling point lies, may be performed in the canonical space as well.

When there are multiple input curves, e.g. together forming an outline of a shape (e.g. a glyph), the closest point on the corresponding canonical curves for each sampling point may be determined for each of the multiple input curves separately, e.g. for a separate set of sampling points surrounding each input curve, with the determination being performed in the canonical space determined for each input curve, such that a closest point on each of the multiple canonical and/or input curves (which may be a start or end point of the canonical or input curve) is determined for a set of sampling points surrounding each input curve, transforming the closest point determined in the canonical space into the world space when necessary. (Again, the set of sampling points for each input curve may surround one or more, or all of the input curves, as is desired.)

These closest points on the multiple curves (when a sampling point has had the closest point determined in the canonical space for two or more, e.g. all, of the multiple input curves) can then be compared against each other, to determine the closest point on the multiple curves to each sampling point, e.g. by comparing the distances from the sampling point to each of the closest points on the multiple curves respectively. This comparison between the closest points, e.g. using the distances thereto from the sampling point, may be performed in the world space or in the canonical space. When performed in the canonical space it may need to use the transformation of the input curves into the canonical space, e.g. when different scalings are needed for transforming the different input curves into the canonical space. When performed in the world space, the determined closest points and/or the distances thereto from the sampling point, should be transformed from the canonical space into the world space, as necessary, using the inverse transformations determined for the input curves respectively.

In another embodiment, the closest point to the multiple curves as a whole (or a sub-set thereof) for each of the sampling points may be determined (e.g. for a suitably chosen array of sampling points surrounding all the multiple input curves). This enables a single closest point on one of the multiple curves (which may be a start or end point of one of the curves) to be determined for each of the sampling points. The closest point may be determined by looping over the one or more of the multiple input curves to determine the closest point to each sampling point, i.e. to determine on which of the one or more of the multiple curves the closest point lies.

Again, the determination of the closest point in this embodiment may be performed in the world space or in the canonical space, with any transformations and/or scalings being performed as necessary. Care may need to be taken for sampling points lying close to the end points of a curve, particularly when working in the canonical space, to determine on which of two or more curves the closest point lies. For example, two input curves may form a corner of a shape such that it is not immediately apparent to which of the curves a sampling point is closest.

In both of the above embodiments, once the (single) closest point on the multiple curves to a sampling point has been determined, in an embodiment an identification of the canonical or input curve on which the closest point lies is determined (and, e.g., stored) for each sampling point.

A similar determination (in the world space or the canonical space) may also be made for the distance from each of the sampling points to the corresponding (single) closest point on the multiple curves as a whole, e.g. comparing the distances for each of the multiple input curves (either in the canonical space or the world space, using the appropriate transformations where necessary).

The closest point or points on the multiple curves to a given sampling point may be determined using all of the multiple input curves, but in an embodiment the closest point is determined for only some of the multiple input curves, e.g. a pre-selected group of one or more input curves from the multiple input curves. The one or more input curves from the multiple input curves, e.g. the pre-selected group, may be chosen in any suitable and desired way, e.g. based on a coarse determination of which of the multiple input or corresponding canonical curves are closest to each of the (e.g. transformed) sampling points and/or which of the multiple input curves lie in the tile in which the sampling point in question falls. Choosing only a limited number of input curves to use for this determination helps to reduce the processing required.

(It will be appreciated that when the render output comprises a glyph, the outline of the glyph is defined by one or more input curves, with the area inside the input curves needing to be shaded appropriately in order to display the glyph. Although there may be multiple input curves that surround any particular point within the glyph, or are close to any particular point outside the glyph, the determination of whether a sampling point falls inside or outside the glyph may be made simply by determining on which of the multiple input curves the closest point lies.)

When the distance between the transformed sampling point and the closest point on the canonical curve to the transformed sampling point has also been determined in the canonical space, in an embodiment this distance, for each of the sampling points, is transformed from the canonical space to the world space, using the inverse transformation for the canonical curve to the input curve, e.g. along with the closest point on the curve.

The closest point (on the canonical or input curve) in the canonical or world space respectively, and the distance from the sampling point to the closest point in the canonical or the world space when available, may be passed straight to the processing circuitry used to generate the render output. (When the distance from the transformed sampling point to the closest point on the canonical curve has not been determined in the canonical space and/or transformed into the world space, in an embodiment the distance from the sampling point to the closest point (on the input curve) in the world space is determined, e.g. using the closest point on the input curve and the sampling point, for each sampling point. This may be determined in the canonical space or the world space, as appropriate.) However, the method may comprise the step of (and the processing circuitry is configured to) storing the closest point on the curve, for each sampling point. The stored value for each closest point may be in the canonical space or in the world space, as appropriate.

When information has been determined for a further set of sampling points based on the already determined information for an initial set of sampling points, e.g. the distances from a sampling point to the closest point on the curve, in an embodiment this information is also stored, e.g. alongside the corresponding information determined for the initial set of sampling points.

When the distance from the sampling point to the closest point has been determined (in the canonical space or the world space, as appropriate), in an embodiment the method comprises the step of (and the processing circuitry is configured to) storing the distance from the sampling point to the closest point on the curve, for each sampling point, e.g. alongside the closest point on the input curve for each sampling point. The stored value for each distance may be in the canonical space but in an embodiment it is in the world space. Storing the transformed distance from the sampling point to the closest point on the curve avoids having to determine this distance again (e.g. using the closest point on the curve stored for each sampling point).

The distance values may be stored in any suitable and desired way (in the canonical space or the world space, as appropriate). The distance values may be stored in the, e.g. raw, form they are calculated. However, in one embodiment, when the distance value is greater than a threshold value, the distance value is truncated, e.g. set to a threshold or default value. By only storing the determined distance values up to a threshold value, storage space can be minimised. Where the sampling point is close to the curve, such that it may be important to have knowledge of the distance, e.g. such that it can be used to generate special rendering effects, the actual distance values are available. However, outside of this distance range, e.g. for sampling points further away from the input curve, it may not be necessary to know the exact value for the distance to the closest point on the input curve, just that it is at least the threshold value.

When there are multiple input curves, the distance from a sampling point to the curve for the multiple curves as a whole (e.g. along with an identification of the curve on which the closest point lies) or the distance from a sampling point to the curve for each of the multiple input curves, and also or instead the corresponding closest point(s), may be stored, as is suitable and desired.

The distance(s) (and also or instead closest point(s)) may be stored in any suitable and desired form (and in the canonical space and/or the world space, as appropriate) and in any suitable and desired storage, such that this information is available to be used when generating the render output. In an embodiment the distance(s) (and also or instead the closest point(s)), for each of the sampling points, are stored in the form of one or more graphics textures. This is particularly advantageous and beneficial as not only are graphics textures intended to store data in respect of arrays of particular geographical locations, but also storing the data in the form of textures allows existing texture-mapping processes commonly incorporated in graphics processing systems to be used to generate the render output in the manner of the technology described herein.

It is also believed that the generation of graphics textures of this form may be new and advantageous in its own right. The technology described herein accordingly also extends to construction of such textures.

Therefore a further embodiment of the technology described herein comprises a method of generating a graphics texture for use in a graphics processing system when generating a render output using an input curve, the method comprising:

- for an input curve defined in a world space:
  - determining a portion of a canonical curve defined in a canonical space that corresponds to the input curve and the transformation needed to map the input curve to the portion of the canonical curve;
  - for each of a plurality of sampling points in the world space surrounding the input curve:
    - transforming the sampling point from the world space to the canonical space using the determined transformation between the world space and the canonical space; and
    - determining, in the canonical space, the closest point on the determined portion of the canonical curve to the transformed sampling point;
  - to thereby determine, for each of the transformed sampling points in the canonical space surrounding the canonical curve, a corresponding closest point on the canonical curve in the canonical space;
  - determining, for each of the sampling points, the distance from the sampling point to the determined closest point on the curve; and
- generating a graphics texture comprising an array of texels, in which each texel corresponds to at least one of the sampling points and has associated with it, for said at least one sampling points, the determined distances(s) to the curve from the at least one sampling points.

Another embodiment of the technology described herein comprises an apparatus for generating a graphics texture for use in a graphics processing system when generating a render output using an input curve, the apparatus comprising:

processing circuitry configured, for an input curve defined in a world space, to:

determine, a portion of a canonical curve defined in a canonical space that corresponds to the input curve and the transformation needed to map the input curve to the portion of the canonical curve;

for each of a plurality of sampling points in the world space surrounding the input curve, to:

transform the sampling point from the world space to the canonical space using the determined transformation between the world space and the canonical space; and determine, in the canonical space, the closest point on the determined portion of the canonical curve to the transformed sampling point;

to thereby determine, for each of the transformed sampling points in the canonical space surrounding the canonical curve, a corresponding closest point on the canonical curve in the canonical space;

determine, for each of the sampling points, the distance from the sampling point to the determined closest point on the curve; and generate a graphics texture comprising an array of texels, in which each texel corresponds to at least one of the sampling points and has associated with it, for said at least one sampling points, the determined distance(s) to the curve from the at least one sampling points.

As will be appreciated by those skilled in that art, these embodiments of the technology described herein can include any one of the optional features of the technology described herein described herein as appropriate.

For example, the distance from each sampling point to the corresponding determined closest point on the curve may be determined in the canonical space or the world space. The determined distance(s) may be stored in, and thus the texture may be stored in (i.e. the texels may be located in), the canonical space or the world space. However in an embodiment the texture (and the texels), and thus also in an embodiment the determined distances, is stored in an intermediate space. The intermediate space may be any suitable and desired space. In an embodiment the intermediate space is a scaled and/or translated version of the world space. This may be to set an origin at a reference point of the texels, e.g. at the bottom left corner, e.g. of a bounding box surrounding the sampling points.

Similarly, in an embodiment, each texel in the one or more textures has associated with it the information discussed above for the solution(s) on the canonical curve for that texel position. In other words each texel will represent at least one position in the canonical space and store information relating to the distance to the closest point on the canonical curve for that position in the canonical space. For example, the information may comprise the parametric value of the closest point(s) and/or the identity of the input curve(s) on which the closest point(s) lie.

Where the information is to be stored in the form of a texture, the texture(s) can be of any suitable and desired size (i.e. contain any number of texels as desired), and each texel may have any desired number of data components associated with it. However, in an embodiment, each texel has associated with it information relating to a single discrete location in the canonical space only.

The texture may also store any other suitable and desired pieces of information. For example the texture may store one or more of: the definition of the input curve(s) in the world space (including any control points of the input curve(s)), the definition of the canonical curve(s) in the canonical space (including any control points of the canonical curve(s)), the transformation of the input curve(s) to the corresponding canonical curve(s), anti-aliasing information (e.g. relating to the determined closest points, distances to the closest points and/or determination of which side of the input curve a sampling point lies), and the eccentricity of the input and/or canonical curves when the curve is an ellipse or a hyperbola. The texture may also store post-processing information about the input curve(s), e.g. that an input curve is to be rendered as a stroked curve and, in an embodiment, also its width (in this example the distance to the curve is used to determine when a sampling point falls within or outside the width of the stroked curve).

When there are a plurality of input curves, in an embodiment the information relating to the plural different input curves, e.g. as detailed above, is stored together, e.g. in the same texture. This may be done, for example, by spatially separating the input curves in the texture, and then sampling the appropriate area in the texture for the input curve in question. Furthermore, when the input curve(s) relate to a glyph, in an embodiment the texture stores information relating to all the glyphs that make up a font, e.g. in the form of a font atlas. As for the multiple input curves this may be done, for example, by spatially separating the glyphs in the texture and then sampling the appropriate area in the texture for the glyph in question.

As noted above, in these embodiments of the technology described herein the texture representing the input curve is configured such that sampled texture points (texels) surrounding the input curve will give sampled texture values indicating the distance to the closest point on the curve from the texture point, e.g. in the canonical or the world space, and possibly also the closest point on the curve to the texture point in the world space, and any other information which may be stored in the texture. Thus, when the texture is sampled, the sampled texture value may be used to determine which side of the curve the sampled point is located, which can then be used to generate the render output using the input curve.

Also or instead of storing the necessary information in a texture, some or all of the information that is determined, or information which is determined as part of the process of determining the information to be used to generate the render output, e.g. as an intermediate step, may be stored in any suitable and desired location in the graphics processing system, e.g. in a cache as discussed above. This may be convenient when the information is being determined in real time. In another embodiment the determined information may be stored in local, e.g. on-chip, memory in the graphics processing system, e.g. pixel local storage.

Once the array of closest points has been determined (and, e.g., stored in a texture), along with any other suitable and desired information, e.g. the distances from the sampling points to the closest points on the curve, that may be determined (and, e.g., stored in the texture) using the closest points on the curve, the render output using the input curve can then be generated, in any suitable and desired way, using the determined closest points on the canonical curve for the transformed sampling points in the canonical space. This may be through use of the determined closest points on the canonical curve directly, or from information derived therefrom, e.g. the closest points when transformed back onto the input curve in the world space or the distances from the sampling points to the closest points on the curve (in the canonical space or the world space, as appropriate).

As described above, the steps to determine and store the closest points to the curve may be performed offline and stored, e.g. in a texture, for later use when generating the render output. In an embodiment, the closest points on the curve are determined in real time, though in an embodiment the closest points on the curve (and/or information related thereto, such as the distances) are also stored, e.g. in a texture, such that they may be available for future use, e.g. when the same input curve is to be used to generate the render output at a later time.

In an embodiment the render output is generated using the determined distance from the determined closest point on the curve to the sampling point (in the canonical space or the world space, as is appropriate). Thus, in an embodiment, to generate the render output using the input curve, when the distance from the determined closest point on the curve to a sampling point has been determined for each of the plurality of sampling points surrounding the curve, the method comprises the steps of (and the graphics processing system comprises processing circuitry configured to):

- for each of a plurality of sampling points in the world space:
  - sampling the determined distance from the determined closest point on the input curve to the sampling point at the position in the world space corresponding to the sampling point; and
- generating the render output using the determined distances for the sampling points in the world space.

The render output may be generated using the determined closest points in any suitable and desired way, e.g. through use of the determined distances as described above. In some embodiments, further information relating to the input curve(s) and the sampling points may be determined, which may be determined when generating the render output using the determined closest points and/or determined along with the closest points such that it may be stored, e.g. in a texture, and used when generating the render output.

In an embodiment, the method comprises the steps of (and the graphics processing system comprises processing circuitry configured to):

- for each of a plurality of sampling points surrounding a curve:
  - determining, using the determined closest point on the curve, on which side of the curve the sampling point should be treated as being;
- to thereby determine, for each of the sampling points surrounding the curve, on which side of the curve a sampling point should be treated as being; and
- using the determinations of on which sides of the curve the sampling points are to be treated as being when generating the render output. The step of determining on which side of the curve a sampling point should be treated as being, may be performed in the canonical space or the world space, as is suitable and desired.

Thus, once they have been determined (and, e.g., sampled from the texture), in an embodiment each of the determined closest points on the curve are used to determine on which side of the curve each of the sampling points should be treated as being. This determination may be performed in any suitable and desired manner. Knowing which side of the curve a sampling point lies allows the render output to be generated using this information. For example, when a sampling point lies within an object (e.g. having an outline defined at least partially by the input curve) it may be shaded the colour of the object, or when a sampling point lies in a shadow (e.g. cast by an object having an outline defined at least partially by the input curve) it may be shadowed appropriately.

The step of determining, using the determined closest point on the curve for each sampling point, on which side of the curve the sampling point should be treated as being, may comprise a tangent check of the sampling point relative to the curve. When the distance between the sampling point and the corresponding closest point on the curve has been determined for the sampling points, the step of determining on which side of the input curve the sampling point should be treated as being may also use the distance from the sampling point to the closest point on the curve. In an embodiment the step of determining the distance from a sampling point to the corresponding closest point on the curve also comprises determining on which side of the curve the sampling point should be treated as being. Again, this may be performed in the canonical space or the word space.

When there are a plurality of input curves, and the closest point on the curves has been determined (and, e.g., stored) for each sampling point for the multiple input curves as a whole, this closest point may be used to determine on which side of the input curve the sampling point should be treated as being. Alternatively, when a closest point has been determined for each of (e.g. at least some of) the multiple curves for each sampling point, these closest points may together be used to determine on which side of the curve the sampling point should be treated as being.

In an embodiment, when there are a plurality of input curves, the step of determining, using the determined closest point, on which side of the input curve the sampling point should be treated as being comprises (and, in an embodiment, the processing circuitry is configured to) performing an average tangent check of the sampling point relative to (e.g. at least some of) the multiple curves. The average tangent check may be performed using the determined closest point and all of the multiple curves, e.g. for a glyph, but in an embodiment only a sub-set of the multiple curves are used to perform the average tangent check. The average tangent check may be performed in the canonical space or the world space.

In an embodiment the sub-set of the multiple curves to be used for the average tangent check are pre-selected, e.g. using the same sub-set that were used when determining the closest point on the curves (which may be those that are closest to the sampling point).

When the input curve comprises a straight line, in an embodiment the step of determining, using the transformed closest point, on which side of the curve the sampling point should be treated as being comprises (and in an embodiment the processing circuitry is configured to) determining when the sampling point is above or below the axis in the canonical space.

When the distance between a sampling point and the corresponding closest point on the curve, and/or on which side of the curve the sampling point should be treated as being have been determined for each of the sampling points, either or both of these pieces of information may be stored, e.g. in a texture. The stored information may be that in the canonical space and/or in the world space. Thus when both of these pieces of information are determined, they may be used (and, e.g., stored) in the form of a signed distance field (e.g. with the side of the curve the sampling is on determining the sign of the distance to the curve that is stored). As described above, in an embodiment the step of determining the distance also determines on which side of the curve a sampling point lies, so these two pieces of information for each sampling point may readily be used and/or stored together.

In an embodiment the step of generating the render output (and the processing circuitry is configured to) uses the distance from the sampling point to the closest point on the curve, in the canonical space or the world space, and/or the determination of on which side of the curve the sampling point should be treated as being. When the distance from the sampling point to the closest point on the curve has been determined previously, the determined value, e.g. stored in a texture, can be used. Alternatively, the distance from the sampling point to the closest point on the curve may be determined from the sampling point and the closest point on the curve.

Thus, in a set of embodiments, both the distance from the sampling point to the closest point on the curve, in the canonical space or the world space, and the determination as to which side of the curve the sampling point should be treated as being are used to generate the render output, e.g. in the manner of a signed distance field.

The render output may be generated in the world space, e.g. in the space in which the sampling points are defined initially in order to determine the closest point on the curve (from where they are transformed into the canonical space) and thus, in an embodiment, the space in which the distance to the closest point is stored, e.g. in a texture, or the render output may be generated in a different "surface" space, e.g. corresponding to the space in which a display is to be output. This latter case may be convenient when text is to be rendered onto a surface in 3D, e.g. which is not oriented flat to the observer. This may be useful in virtual or augmented reality.

In this latter embodiment, the determined closest points on the curve may be sampled directly and used to generate the render output. However, in an embodiment, to generate the render output using the input curve, when the distance from the determined closest point on the curve to a sampling point has been determined for each of the plurality of sampling points surrounding the curve, the method comprises the steps of (and the graphics processing system comprises processing circuitry configured to):

for each of a plurality of sampling points in a surface space:
  sampling the determined distance from the closest point on the input curve to the sampling point at the position in the world space corresponding to the sampling point in the surface space; and
generating the render output using the determined distances for the sampling points in the world space.

When the determination of on which side of the curve the sampling point should be treated as being has been determined (and, e.g., stored), in an embodiment this information is also sampled at the position in the world space corresponding to the sampling point in the surface space, for each of a plurality of sampling points in a surface space, and then used to generate the render output, e.g. using an appropriate transformation of the information, when necessary, between the world space to the surface space. In another embodiment, the distance from the sampling point to the closest point on the input curve and/or the determination of on which side of the curve the sampling point should be treated as being may be determined in the surface space.

When generating the render output in a surface space, in an embodiment the first step in generating the render output using the input curve is to sample, for each of a plurality of sampling points in a surface space (the space in which the render output is to be generated, e.g. displayed), the determined distance from the closest point on the curve to the sampling point at the position in the world space corresponding to the sampling point (and, in an embodiment, also the determination of on which side of the input curve the sampling point should be treated as being). For this, an appropriate transformation between the surface space and the world space for the sampling points may have to be performed, depending on the relationship between surface space and the world space. A further transformation from the world space into the canonical space may also need to be performed, e.g. when the information determined for the sampling point has only been determined in the canonical space and not transformed back into the world space.

For example, the surface space may lie in a plane parallel to the world space, e.g. when the input curve forms at least part of an object, e.g. a glyph, to be rendered, such that the render output may relate to a 2D image. In this case the surface space may be the same space as the world space (or within a scaling factor), such that the plurality of sampling points in the surface space may correspond directly to the plurality of sampling points in the world space (although the sampling points in the surface space may not be provided at the same density as the sampling points in the world space, such that they may need to be mapped appropriately to the corresponding sampling point in the world space).

In another embodiment, a transformation of the sampling points may need to be performed between the surface space and the world space, as the render output may relate to a 3D scene, e.g. with the curve being used to create a shadow or when writing is displayed on curved surfaces (e.g. for virtual reality).

As has been alluded to, the input curve (and thus also the texture where provided) may be used to render a different object from the one that the input curve forms at least part of, e.g. using shadows. However in an embodiment the input curve forms at least part of the object being rendered, e.g. it forms the outline thereof. For example, the object to be rendered may comprise a glyph (as part of a font). The input curve may be defined in the form of any curved representation, e.g. vector graphics. In an embodiment the input curve in defined in a scalable vector graphics (SVG) format.

Once the information that has been determined for the input curve to be used when generating the render output, e.g. the closest point on the input curve, the distance from the sampling point to the closest point on the input curve and/or the determination as to which side of the input curve the sampling point should be treated as being, the render output may be generated in any suitable and desired manner, e.g. directly in the world space or from a surface space. When a texture has been determined and stored, this may be performed using, for example, any suitable graphics texture mapping process.

In an embodiment, the render output is generated, e.g. for display, by first generating a primitive or primitives covering the scene area where the render output is to appear, e.g. in a surface space, and then using the determined information for the input curve over the scene area covered by the primitive or primitives, e.g. by applying the texture to the primitive or primitives and shading the primitive or primitives accordingly.

The primitive or primitives may be generated as desired, for example by defining one or more bounding boxes or bounding polygons covering the scene area where the shape to be drawn is to appear, e.g. covering a glyph.

It may be necessary when generating the primitives to ensure that the generated primitive(s) only sample the desired (and appropriate) areas of the texture. (This may particularly be the case where multiple input curves (or, e.g., glyphs) are represented in the same texture.)

The generated primitives may then be rasterised to a plurality of sampling points within the primitives and fragments generated, and the, e.g. texture, representing the input curve applied to each sampling point (and/or fragment) of the primitive or primitives by sampling positions in the texture corresponding to the primitive sampling point (and/or fragment) positions. (The texture should be sampled using the appropriate texture filtering process, such as bilinear filtering.) This may involve generating an array of sampling points covering the one or more primitives in the surface space and transforming these sampling points into the world space in which the determined information, e.g. from a texture, can be sampled.

The sampled information, e.g. texture values, is then used to shade the corresponding sampling position(s) appropriately, e.g. using the determination of on which side of an input curve the sampling position(s) should be treated as being and/or the distance of the sampling position(s) to the input curve. Based on this determination, the plurality of sampling points are assigned data, such as red, green and blue (RGB) colour values and an "alpha" transparency value, as appropriate to allow the scene, e.g. containing glyphs, to be correctly displayed.

As will be appreciated, when the distance from the sampling point to the closest point on the input curve is available to be used when generating the render output, this may be used to allow more complicated rendering effects, e.g. rotations, shadowing, etc., to be performed than, for example, when only a threshold for the edge of the input curve is available.

The technology described herein is applicable to any form or configuration of renderer, such as renderers having a "pipelined" arrangement (in which case the renderer will be in the form of a rendering pipeline). In an embodiment it is applied to a hardware graphics rendering pipeline. The various functions and elements, etc. of the technology described herein can be implemented as desired, for example, by appropriate functional units, processing logic, processors, microprocessor arrangements, etc. It is also envisaged, in an embodiment, that the technology described herein may be performed on a minimally functioning, e.g. stripped-down version, graphics processing pipeline. Such a system may be suitable for use in low-power devices, e.g. wearables, e-readers, etc.

The technology described herein is applicable to all forms of rendering, such as immediate mode rendering, deferred mode rendering, tile-based rendering, etc. In one embodiment it is used in and for deferred mode rendering and tile-based renderers.

As will be appreciated from the above, the technology described herein is particularly, although not exclusively, applicable to 2D or 3D graphics processors and processing devices, and accordingly extends to a 2D or 3D graphics processor and a 2D or 3D graphics processing platform including the apparatus of or operated in accordance with any one or more of the embodiments of the technology described herein. Subject to any hardware necessary to carry out the specific functions discussed above, such a 2D or 3D graphics processor can otherwise include any one or more or all of the usual functional units, etc., that 2D or 3D graphics processors include. In an embodiment the system comprises fixed function hardware units specifically arranged to determine the closest point on a curve to a sampling point and/or the distance from the sampling point to the closest point on the curve (e.g. in the canonical space), for example.

In an embodiment the execution pipeline also comprises, and/or is in communication with, one or more memories and/or memory devices that store the data described herein, and/or that store software for performing the processes described herein. The execution pipeline may also be in communication with a host microprocessor, and/or with a display for displaying images based on the data generated by the execution pipeline.

The technology described herein is applicable to any suitable form or configuration of graphics processor. It is particularly applicable to tile based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered, e.g. fragment, data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, stages, etc., of the technology described herein may be duplicated and/or carried out in parallel on a given processor. Equally, the various processing stages may share processing circuitry, etc., when desired.

Subject to any hardware necessary to carry out the specific functions discussed above, the graphics processing system and, e.g., pipeline can otherwise include any one or more or all of the usual functional units, etc., that graphics processing pipelines include.

It will also be appreciated by those skilled in the art that all of the described embodiments of the technology described herein can include, as appropriate, any one or more or all of the optional features described herein.

The methods in accordance with the technology described herein may be implemented at least partially using software, e.g. computer programs. It will thus be seen that in further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes, in conjunction with said data processor, said graphics processor, renderer or system to carry out the steps of the methods of the technology described herein. Such a computer software carrier could be a physical storage medium such as a ROM chip, CD ROM, RAM, flash memory or disk.

It will further be appreciated that not all steps of the methods of the technology described herein need be carried out by computer software and thus from a further embodiment the technology described herein comprises computer software, and such software installed on a computer software carrier, for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, flash memory or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

As discussed above, the basic premise of the technology described herein is to generate a render output using an input curve, with the closest point on the input curve to each of various sampling points being determined for use in the rendering, e.g. to determine on which side of the input curve a sampling point should be treated as being. The input curve may form at least part of an object to be rendered (e.g. at least part of the edge thereof) or it may form at least part of a shape or curve to be used in some other way as part of the render output, e.g. for shadowing.

An embodiment of the technology described herein will now be described in the context of rendering, using a graphics processing system, text in the form of glyphs (the graphical representation of characters as part of a font), the edges of which are defined by one or more input curves. In this embodiment, a texture is generated which represents the glyph using a signed distance field, and then the texture sampled to render the glyph, e.g. using the signed distance field to determine on which side of a curve forming the edge of the glyph a sampling point lies.

FIG. 1 shows an overview of the workflow for rendering a string of text according to an embodiment of the technology described herein. The first step (Step 1) when generating a render output containing a string of text, e.g. the word "reinforced", is to define a set of rectangular bounding boxes, one for each glyph (letter in the word), which is split into two triangles for the purpose of defining the texture for each glyph. The bounding boxes may be provided by the font file, i.e. which is input into the graphics processing system, with the spacing between each box determining the spacing between each of the letters in the word. The signed distance field for each individual glyph can then be calculated (Step 2, FIG. 1), as will now be described.

Figure 2:
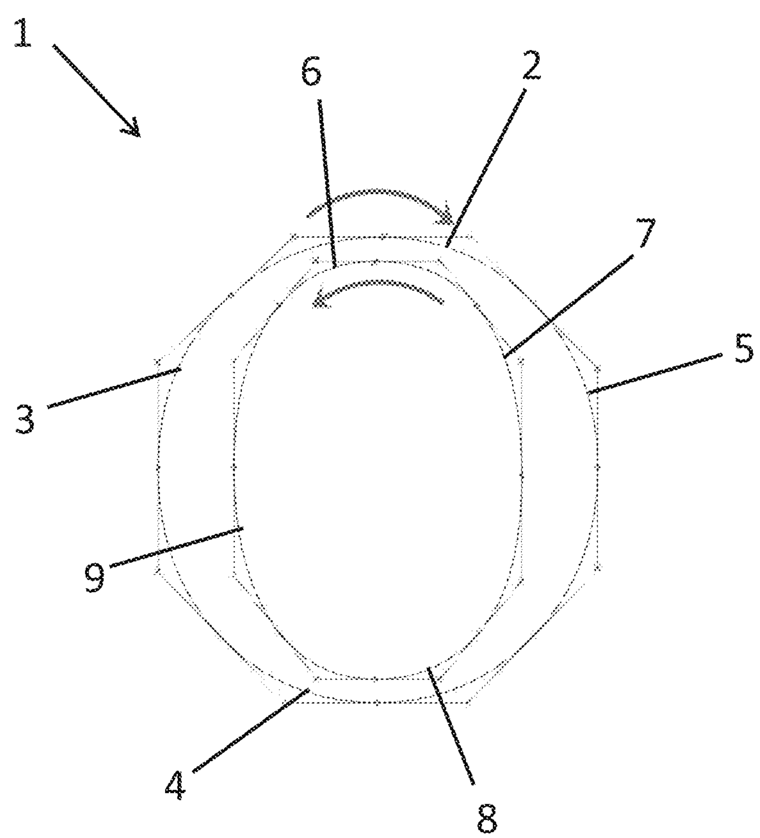
FIG. 2 shows a glyph for rendering having its edges defined by a series of input curves as part of the process in an embodiment of the technology described herein.

FIG. 2 shows a glyph 1 having its edges defined by a series of input curves.

In order to render the glyph 1 for display, the glyph 1, or typically information that defines the glyph 1, is initially input into the graphics processing system.

As shown in FIG. 2, a glyph 1 (e.g. in the form of a vector graphics object) of the letter "O", is defined as a sequence of quadratic Bezier curves 2, 3, 4, 5, 6, 7, 8, 9 in a 2D world space by the position of start and end control points of the curves and the position of an intermediate control point. The outside of the glyph is defined by four quadratic Bezier curves 2, 3, 4, 5 and the inside of the glyph is defined by a further four quadratic Bezier curves 6, 7, 8, 9. When the glyph 1 is rendered, as will be described in more detail below, the area between the inner and outer curves 2, 3, 4, 5, 6, 7, 8, 9 is appropriately shaded, so as to display the glyph 1.

During the rendering process, initially each of the constituent quadratic Bezier curves 2, 3, 4, 5, 6, 7, 8, 9 that form the glyph 1 is treated separately. For each of the quadratic Bezier curves 2, 3, 4, 5, 6, 7, 8, 9 the curve in the world space is mapped to a corresponding portion of a canonical curve in a canonical space, to enable the determination (in the canonical space) of the closest point on the curve to each of a plurality of sampling points surrounding the curve to be made. (Determining the closest points in the canonical space allows an exact calculation to be performed which thus allows an accurately calculated signed distance field for the curve to be determined.)

The process of transforming the initially defined input curve in the world space to a canonical curve in a canonical space will now be described.

Figure 3:
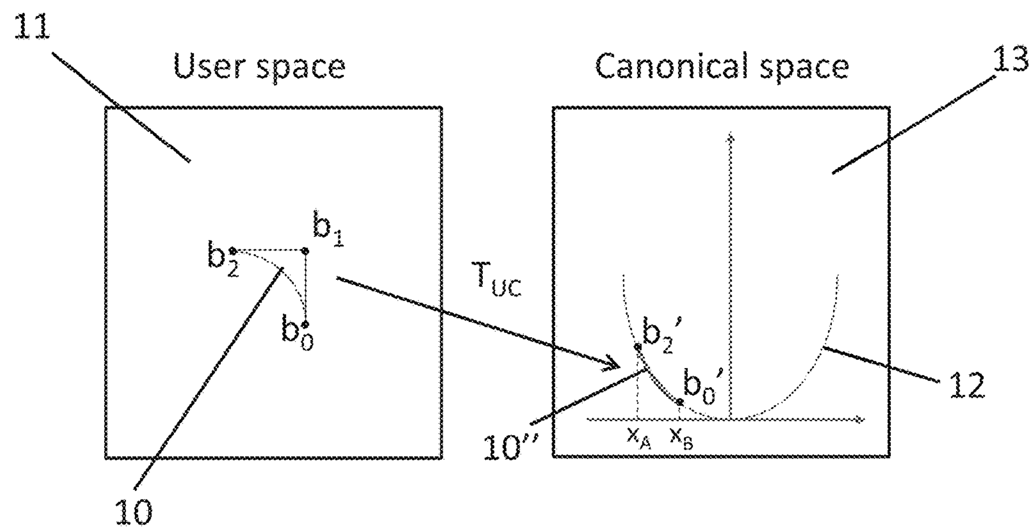
FIG. 3 shows a transformation for an input curve from a world space into a canonical space as part of the process in an embodiment of the technology described herein.

FIG. 3 shows an exemplary transformation $T_{UC}$ for an input Bezier curve 10 in the world space 11 to a corresponding portion 10" of a canonical curve 12 in the canonical space 13. The input Bezier curve 10 in the world space 11, has a start control point $b_0$, an end control point $b_2$ and an intermediate control point $b_1$ which define the curve in the world space, which is mapped to a portion 10" of the canonical curve 12 in the canonical space 13 which has a corresponding start point $b_0'$ and a corresponding end point $b_2'$.

A canonical curve 12, which, as discussed above, is a predefined, single or fundamental curve that all curves within a family of curves can be transformed onto (or at least onto a portion of) using only rotation, translation and/or uniform scaling, is defined in a canonical space 13. For example, in the present embodiment where the input Bezier curve 10 as defined in the world space 11 is a quadratic curve (being defined by three control points), the canonical curve 12 is the curve $y=x^2$.

As will be appreciated, in order to implement the present embodiment, it is necessary to determine the world-to-canonical transformation ($T_{UC}$), i.e. the transformation that maps the input Bezier curve 10 as defined in world space 11 to a corresponding portion 10" of the canonical curve 12 in the canonical space 13.

Figure 4A:
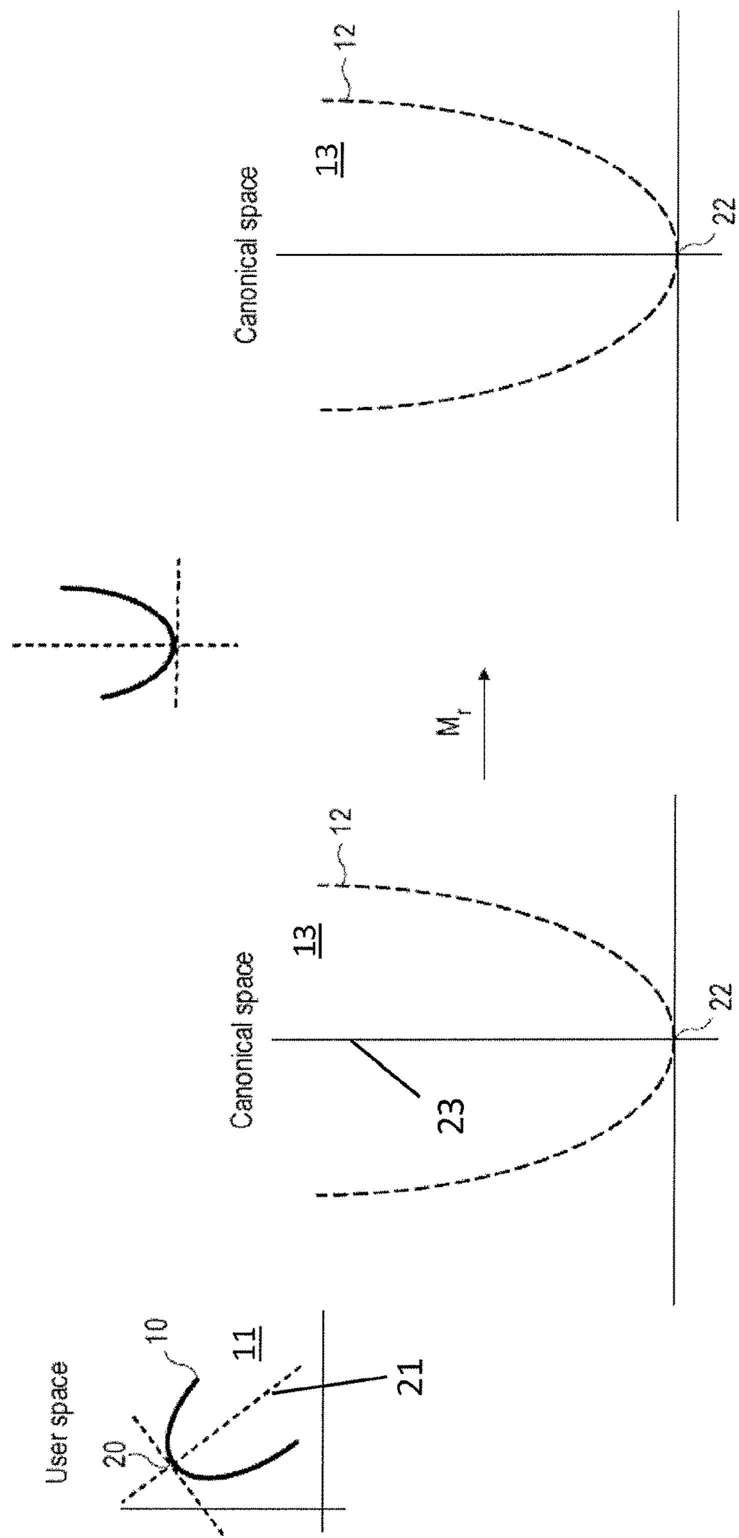
FIGS. 4A, 4B and 4C show the steps in the transformation for an input curve from a world space into a canonical space as part of the process in an embodiment of the technology described herein.
Figure 4B:
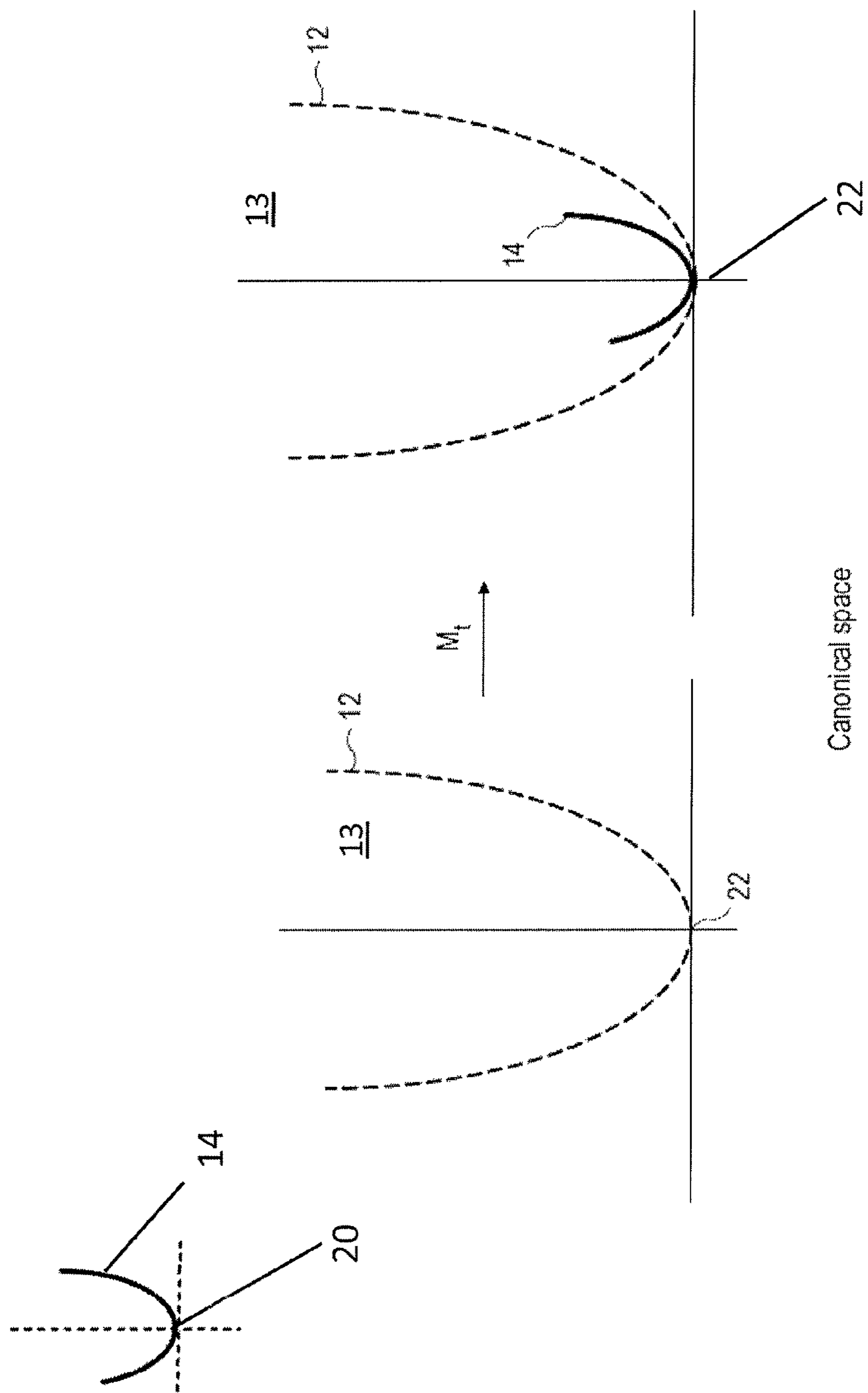
Figure 4C:
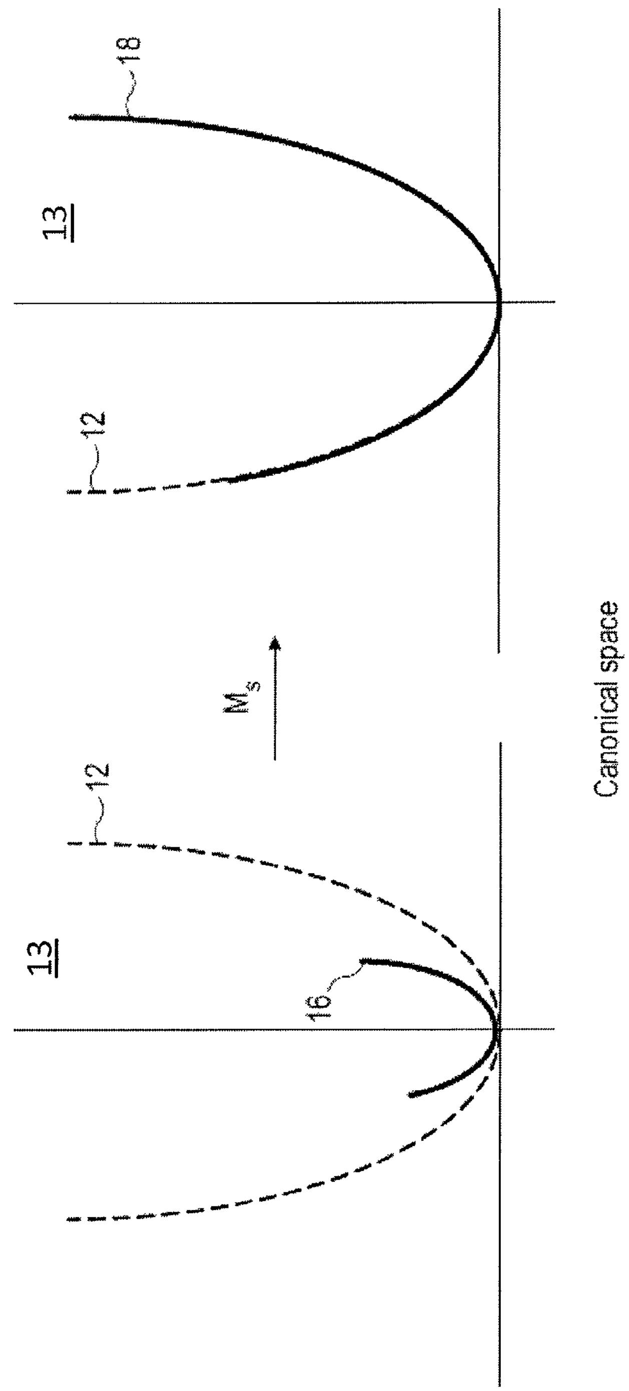

The manner in which in which the transformation from the input Bezier curve 10 in the world space 11 to the canonical curve 12 in the canonical space 13 is derived in the present embodiment for any given quadratic Bezier curve is shown in FIGS. 4A-C.

In a projective representation of 2D space, points in 2D space a are represented as vectors A in 3D with components ($a_x$, $a_y$, 1). This representation is homogeneous, so A and AA represent the same point.

A general second-degree curve is defined by an equation of the form $$X^tCX = \begin{pmatrix} x & y & 1 \end{pmatrix} \begin{pmatrix} a & h & g \\ h & b & f \\ g & f & c \end{pmatrix} \begin{pmatrix} x \\ y \\ 1 \end{pmatrix} = 0$$

This is equivalent to the component equation $$ax^2+2hxy+by^2+2gx+2fy+c=0$$

A general quadratic Bezier curve is defined from this equation by the coefficients satisfying:

$$ab-h^2=0$$

It is assumed that the input for the quadratic Bezier curve is three control points in 2D: $b_0$, $b_1$ and $b_2$, where $b_0$ and $b_2$ are the two end points and $b_1$ is the intermediate point. From this, the world-to-canonical transformation, to a segment of the canonical curve, $y=x^2$, needs to be determined.

The world-to-canonical transformation, as mentioned above, consists only of rotation (as defined by a matrix $M_r$), translation (as defined by a matrix $M_t$) and/or uniform scaling (as defined by a matrix $M_s=kI$, where k is a constant and I is the identity matrix).

The first stage is to find the coefficients (a, b, c, f, g, h) of the component equation from the three control points $b_0$, $b_1$, $b_2$. Then these coefficients can be used to compute the rotation, translation and scaling needed to bring the input Bezier curve onto the canonical curve.

With $b_0=(x_0,y_0)$, $b_1=(x_1,y_1)$ and $b_2=(x_2,y_2)$ the coefficients are given as:

$$a=(y_0-2y_1+y_2)^2$$

$$b=(x_0-2x_1+x_2)^2$$

$$c=x_0^2y_2^2-4x_0x_1y_1y_2-2x_0x_2y_0y_2+4x_0x_2y_1^2+4x_1^2y_0y_2-4x_1x_2y_0y_1+x_2^2y_0^2$$

$$h=-(y_0-2y_1+y_2)(x_0-2x_1+x_2)$$

$$g=x_0y_0y_2-2x_0y_1^2+2x_0y_1y_2-x_0y_2^2+2x_1y_0y_1-4x_1y_0y_2+2x_1y_0y_1-x_2y_0^2+2x_2y_0y_1+x_2y_0y_2-2x_2y_1^2$$

$$f=-(x_0^2y_2-2x_0x_1y_1-2x_0x_1y_2-x_0x_2y_0+4x_0x_2y_1-x_0x_2y_2+2x_1^2y_0+2x_1^2y_2-2x_1x_2y_0-2x_1x_2y_1+x_2^2y_0)$$

The world-to-canonical transformation ($T_{UC}$), i.e. a 3×3 matrix, now needs to be found that transforms points in the world space into the canonical space, via a combined rotation, translation and scaling. The effect of this transformation is to map the end points of the Bezier curve onto the canonical curve, $y=x^2$.

The first stage of the process for determining the world-to-canonical transformation ($T_{UC}$) in the present embodiment is to determine the rotation component of the transformation (the rotation matrix $M_r$). The required rotation is determined as being that needed to rotate the axis of symmetry 21 of the input quadratic Bezier curve 10 in the world space 11 to be parallel to the axis of symmetry 23 of the canonical curve 12 in the canonical space 13—see FIG. 4A.

This rotation is determined by manipulating the quadratic form for the input Bezier curve 10 to calculate the rotation matrix $M_r$. First a rotation matrix $M_r$ is defined as $$M_r = \begin{pmatrix} \cos\theta & -\sin\theta & 0 \\ \sin\theta & \cos\theta & 0 \\ 0 & 0 & 1 \end{pmatrix}$$

where $$\cos\theta = \sqrt{\frac{a}{a+b}}$$

$$\sin\theta = -\mathrm{signum}((a+b)h)\sqrt{\frac{b}{a+b}}$$

and the signum function is defined as signum(x)=−1 if x<0 signum(x)=+1 otherwise

The condition that $ab-h^2=0$ is guaranteed for a set of points on the input quadratic Bezier curve 10, so the arguments of the square roots in the expressions for cos θ and sin θ will both be positive. (In the case of a=b=0, this is a straight line, which should be identified upfront and treated separately, as discussed below.)

The transformed values for f and g can thus be defined via the rotation $$\begin{pmatrix} g' \\ f' \end{pmatrix} = \begin{pmatrix} \cos\theta & -\sin\theta \\ \sin\theta & \cos\theta \end{pmatrix} \begin{pmatrix} g \\ f \end{pmatrix}$$

Once the rotation component of the world-to-canonical transformation has been determined, the translation component (i.e. the rotation matrix $M_t$) is next determined. This process is shown in FIG. 4B.

The required translation is determined as being that needed to translate the nadir 20 of the rotated input curve 14 to the origin (0,0) in the canonical space 13, i.e. at the corresponding nadir 22 of the canonical curve 12. This translation is again determined by manipulating the quadratic form for the input Bezier curve 10 to calculate the translation matrix $M_t$. First a rotation matrix $M_t$ is defined as $$M_t = \begin{pmatrix} 1 & 0 & x_0 \\ 0 & 1 & y_0 \\ 0 & 0 & 1 \end{pmatrix}$$

where $$x_0 = \frac{g'}{a+b}$$

$$y_0 = \frac{1}{2f'}\left(c - \frac{g'^2}{a+b}\right)$$

Finally, the uniform scaling component (i.e. the scaling matrix $M_s$) of the world-to-canonical transformation is determined. This is shown in FIG. 4C.

As will be appreciated, the input curve 10 in world space 11 once having been suitably rotated and translated into canonical space 13, i.e. the curve 16 in FIG. 4C, is now of the form $y=x^2/|\lambda|$, where $1/|\lambda|$ is the scaling factor to be determined. Again, this translation is determined by manipulating the quadratic form for the input Bezier curve 10 to calculate the scaling matrix $M_s$. First a scaling matrix $M_s$ is defined as:

$$M_s = \begin{pmatrix} \lambda & 0 & 0 \\ 0 & \lambda & 0 \\ 0 & 0 & 1 \end{pmatrix}$$

where $$\lambda = -\frac{a+b}{2f'}$$

Once the world-to-canonical transformation, i.e. $T_{UC}=M_sM_tM_r=1/|\lambda|M_tM_r$, needed to map the input Bezier curve 10 as defined in the world space 11 onto the corresponding portion 10" of the canonical curve 12 in the canonical space 13 has been calculated, the actual portion 10" of the canonical curve 12 can be determined by applying the determined transformation to the parameters of the input Bezier curve 10. This process is illustrated in FIG. 3.

As shown in FIG. 3, the input Bezier curve 10 as defined in the world space 11, and having control points $b_0$, $b_1$, $b_2$, is mapped using the world-to-canonical transformation $T_{UC}$ to the corresponding portion 10" of the canonical curve 12.

The start and end points $b_0'$, $b_2'$ of the canonical curve segment 10" define the parametric (x) range of the input Bezier curve 10 in the canonical space 13. Therefore, as shown in FIG. 3, the canonical curve segment 10" has a parametric range extending between parametric locations $x_A$ and $x_B$ in the canonical space 13.

In the present embodiment, a set of sampling points in the world space 11 is defined for each of the input Bezier curves 2, 3, 4, 5, 6, 7, 8, 9 forming the glyph 1 (e.g. as shown in FIG. 2). For any given input Bezier curve (e.g. the input Bezier curve 10 defined in the world space 11 as shown in FIG. 3), the closest point on the input Bezier curve is determined for each of the sampling points surrounding the input Bezier curve.

For a given sampling point in the world space 11, the closest point on the input Bezier curve 10 is determined by first transforming the sampling point in the world space to a corresponding position in the canonical space 13, using the previously determined world-to-canonical transformation $T_{UC}$ for mapping the input Bezier curve 10 in the world space 11 onto the portion 10" of the canonical curve 12 in the canonical space 13. The closest point on the portion 10" of the canonical curve 12 to the transformed sampling point in the canonical space 13 corresponding to the sampling point in the world space 11 is determined by minimising the distance from the transformed sampling point to the canonical curve.

For a transformed sampling with coordinates (u,v), the distance from this point to the curve can be written solely in terms of the x-coordinate in the canonical space:

$$D=\sqrt{(x-u)^2+(x^2-v)^2}$$

It is simpler to minimise $D^2$, which gives $$4x^3 + (1-2v)2x - 2u = 0$$

or $$x^3 + ax + b = 0$$

-continued where $$a = \frac{1}{2} - v$$

$$b = -\frac{u}{2}$$

This cubic equation is already in a standard form and so closed form solutions can be written down straight off. There are three cases to consider, depending on the relationship between a and b.

When $b^2/4+a^3/27>0$, there is only one real root defined by $$x_1 = \left(-\frac{b}{2} + \sqrt{\frac{b^2}{4} + \frac{a^3}{27}}\right)^{1/3} + \left(-\frac{b}{2} - \sqrt{\frac{b^2}{4} + \frac{a^3}{27}}\right)^{1/3}$$

The cube root here is well-defined, because the argument is guaranteed to be real, and the cube root is defined for both positive and negative arguments (the cube root of a negative number is negative).

When $b^2/4+a^3/27=0$, this is degenerate case where two of the three roots coincide. However, as the global minimum is being sought, any points of inflection are of no interest, so the preceding formula for $x_1$ still holds and there is a single minimum.

(The transition curve between needing to store one solution and two is $$x_1=16/27(v-1/2)^3$$

This curve goes out from the focus of the parabola.)

When $b^2/4+a^3/27=0$, this corresponds to the cubic equation having three distinct real roots, given by:

$$x_k = 2\sqrt{\frac{-a}{3}}\cos\left(\frac{\varphi}{3} + \frac{2k\pi}{3}\right);\ k = 0, 1, 2$$

where $$\cos\varphi = -\sqrt{\frac{b^2/4}{-a^3/27}} \ \text{ if } b > 0$$

$$\cos\varphi = \sqrt{\frac{b^2/4}{-a^3/27}} \ \text{ if } b < 0$$

The middle root (depending on φ) is a global maximum and can be ignored. The outer two roots of these will correspond to local minima and are of interest. The absolute minimum (one of the two local minima) may not necessarily be the closest point on the portion 10" of the canonical curve 12 to the transformed sampling point, as it may fall outside of the portion 10" of the canonical curve 12. A check is performed to see when one or both of the outer roots falls inside the portion 10" of the canonical curve 12, with the distances from the transformed sampling point to the points on the portion 10" of the canonical curve 12 corresponding to the two outer roots being compared when necessary, to allow the closest point on the portion 10" of the canonical curve 12 to the transformed sampling point to be determined.

Once this closest point on the portion 10" of the canonical curve 12 to the transformed sampling point has been determined, the distance to the point from the position of the transformed sampling point, in the canonical space 13, is calculated (if this has not already been calculated as part of the determination of the closest point, as outlined above).

The distance from the transformed sampling point to the closest point on the curve may be determined in any suitable and desired way. As the x and y coordinates of the transformed sampling point are known, and the x value of the closest point has been determined, $y=x^2$ (the canonical curve) gives the y coordinate of the closest point. The distance is then easily determined from these two sets of coordinates.

One way to calculate the distance is to translate the start point $b_0'$ of the portion 10" of the canonical curve 12 to the origin, and to then rotate the end point $b_2'$ to lie on the positive x-axis.

For a portion 10" of the canonical curve 12 with a start point $b_0'$ having coordinates $(x_0,y_0)$ and an end point $b_2'$ having coordinates $(x_1,y_1)$, first a translation matrix is defined $$T=\begin{pmatrix}1 & 0 & -x_0\\ 0 & 1 & -y_0\\ 0 & 0 & 1\end{pmatrix}$$

and a rotation matrix $$R_\theta=\begin{pmatrix}(x_1-x_0)/d & (y_1-y_0)/d & 0\\ -(y_1-y_0)/d & (x_1-x_0)/d & 0\\ 0 & 0 & 1\end{pmatrix}$$

where $$d=\sqrt{(x_1-x_0)^2+(y_1-y_0)^2}$$

This rotates the end point round to (d,0). This point could be scaled to the point (1,0), but there is no real benefit in doing so.

Thus, the transformation matrix can be defined as $R=R_\theta T$, and the coordinates of the transformed point denoted as (u,v). The distance, s, to the closest point on the curve is then given by:

$$s=\sqrt{u_2+v^2}\text{ if } u<0$$

$$s=|v|\text{ if } 0<u<d$$

$$s=\sqrt{(u-d)^2+v^2}\text{ if } u>0$$

Note that the sign of v also determines on which side of the line the sampling point lies, so this can be used as the sign for the signed distance field.

This distance is then compared to the distances from the sampling point to each end of the portion of the canonical curve. Out of these three points, the point on the portion 10" of the canonical curve 12 having the smallest distance to the transformed sampling point is determined to be the closest point on the canonical curve 12 to the transformed sampling point.

Figure 5:
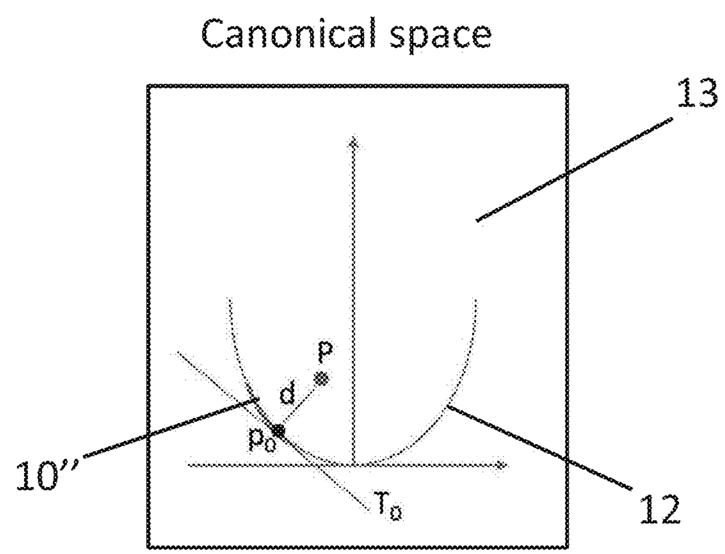
FIG. 5 shows the step of determining a closest point on a canonical curve to a sampling point as part of the process in an embodiment of the technology described herein.

FIG. 5 shows the point $p_0$ which has been determined to be the closest on the portion 10" of the canonical curve 12 to the transformed sampling point P in the canonical space 13. For this transformed sampling point P the closest point $p_0$ on the canonical curve has been determined to be that which minimises the distance to the canonical curve 12 from the transformed sampling point P, i.e. thus determining that the point $p_0$ on the canonical curve 12 is the closest point to the transformed sampling point P. This is because, for this sampling point and the portion of the canonical curve, the distance d between the transformed sampling point p and the closest point $p_0$ is less than both of the distances to the end points of the portion of the canonical curve from the transformed sampling point p.

As also shown in FIG. 5, the distance d from the transformed sampling point P to the closest point $p_0$ on the portion 10" of the canonical curve 12 can simply be determined from these points, when it has not already been determined from the process of minimising the distance to find the closest point $p_0$.

When the input curve is a straight line, the curve defined in the world space is transformed onto the x-axis in the canonical space, using a world-to-canonical transformation including a rotation and a translation (the input curve, when of finite length, may also be scaled, e.g. to lie between 0 and 1 on the x-axis of the canonical space, but this is not necessary). The closest point on the canonical curve is then simply the x coordinate of the transformed sampling point in the canonical space. When the input curve has a finite length, with start and end points, the closest point on the canonical curve to the transformed sampling point is the x coordinate of the transformed sampling point when the x coordinate of the transformed sampling point lies between the x coordinates of the start and end points of the canonical curve. When the x coordinate of the transformed sampling point lies outside the start and end points of the canonical curve, the closest point on the canonical curve to the transformed sampling point is the closer of the start or the end points to the transformed sampling point.

Once determined, distance d (from the transformed sampling point P in the canonical space 13 to the closest point $p_0$ on the canonical curve 12), and when necessary the closest point $p_0$ on the portion 10" of the canonical curve 12, are then transformed into the world space 11, using the inverse of the transformation $T_{UC}$ from the world space 11 to the canonical space 13, i.e. to give the closest point on the input Bezier curve 10 to the sampling point in the world space 11 and the distance between these points. This process, of determining the closest point on the input Bezier curve 10 for a sampling point and the distance between these points, is repeated for each of the sampling points in the array surrounding the input Bezier curve 10 in the world space 11.

The distance to the input Bezier curve 10 for a further set of sampling points may also be determined, using the already determined distances for nearby sampling points, without having to perform the transformation into, and the determination in, the canonical space.

Once this has been completed for each of the sampling points, such that a closest point on the input Bezier curve 10 and a distance thereto has been determined for each of the sampling points in the world space 11, in an array surrounding the input Bezier curve 10, this process is repeated for each of the input Bezier curves 2, 3, 4, 5, 6, 7, 8, 9 which form the glyph 1.

Using these multiple arrays of sampling points, corresponding to the multiple input Bezier curves 2, 3, 4, 5, 6, 7, 8, 9 forming the glyph 1, the closest point on the multiple input Bezier curves 2, 3, 4, 5, 6, 7, 8, 9 as a whole for each sampling point in an array of sampling points surrounding the whole glyph 1 can be determined, and also the distances between the respective closest points and sampling points. For a given sampling point, the closest point on the multiple input Bezier curves 2, 3, 4, 5, 6, 7, 8, 9 and the distance thereto is determined by simply comparing the distances for the corresponding sampling points in each of the arrays of sampling points surrounding the individual input Bezier curves 2, 3, 4, 5, 6, 7, 8, 9 that have been determined and choosing the smallest distance.

(The closest point on the multiple input Bezier curves 2, 3, 4, 5, 6, 7, 8, 9 to a given sampling point may be determined only using a sub-set of all of the multiple input Bezier curves 2, 3, 4, 5, 6, 7, 8, 9 making up the glyph 1, e.g. by discarding one or more of the input Bezier curves 2, 3, 4, 5, 6, 7, 8, 9 which are clearly further away than others. For example, for the glyph 1 shown in FIG. 2, for a sampling point that lies to the right of the glyph 1, the input curves 3, 9 to the left of the glyph 1 could be discarded.)

If the side of the input Bezier curve 10 on which each sampling point in the world space lilies has not already been determined, e.g. as part of determining the distance from the sampling point to the closest point on the curve, this is then determined by performing an average tangent check of the sampling point in the canonical space 11 against the canonical curves corresponding to the multiple input Bezier curves 2, 3, 4, 5, 6, 7, 8, 9. Again, the multiple input Bezier curves 2, 3, 4, 5, 6, 7, 8, 9 for performing the average tangent check for a sampling point may be a sub-set of all of the multiple input Bezier curves 2, 3, 4, 5, 6, 7, 8, 9 making up the glyph 1, and these may correspond to sub-set used to determine the closest point on the multiple input Bezier curves 2, 3, 4, 5, 6, 7, 8, 9 to the sampling point.

The side of the input Bezier curve 10 on which each sampling point in the world space lilies is used, with the distance between the sampling point and the determined closest point on the input Bezier curve 10 to the sampling point, to give a sign to the distance: distances corresponding to sampling points lying inside the glyph are given a negative sign, distances corresponding to sampling points lying outside the glyph are given a positive sign.

The signed distance, along with the determined closest point on the input Bezier curve 10 to the sampling point and an identification of the input Bezier curve (of the multiple input Bezier curves 2, 3, 4, 5, 6, 7, 8, 9 that form the glyph 1) on which the determined closest point lies, for each sampling point surrounding the glyph 1 are stored in a texture, i.e. with each texel in the texture for which this information is stored corresponding to a sampling point. Thus, the texture stores the glyph 1 as a signed distance field, which can then be used to render the glyph 1, as discussed below.

The information to be stored in the texture for each texel (the signed distance, the determined closest point on the input Bezier curve and the identification of the input Bezier curve on which the determined closest point lies), is determined as described above for each of the glyphs in a particular font, with this information (i.e. including the signed distance field) for each of the glyphs being stored in the texture.

Figure 6:
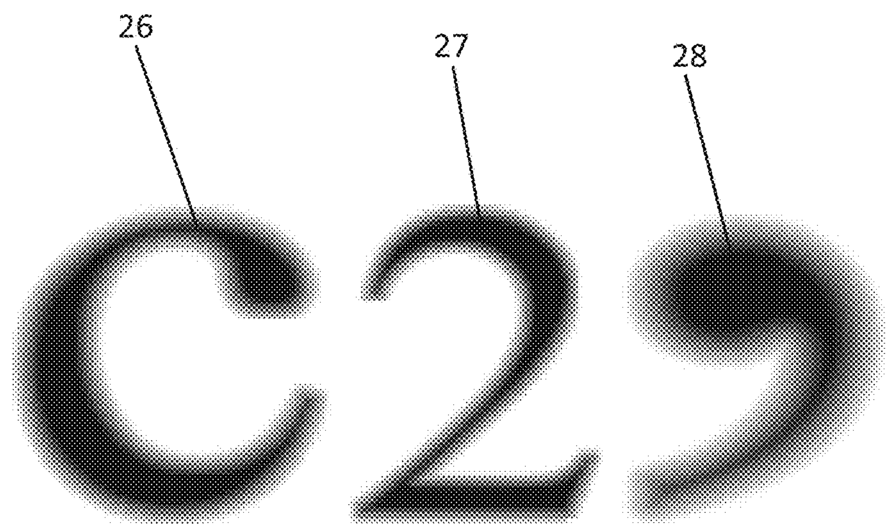
FIG. 6 shows a graphical representation of a signed distance field for three glyphs generated in an embodiment of the technology described herein.

A graphical representation of an exemplary signed distance field is shown in FIG. 6 for the glyphs representing the characters “c” 26, “2” 27 and “,” 28. Points inside the glyphs 26, 27, 28, with positive distance values (above a certain threshold) to the respective closest points on the input Bezier curves defining the edge of the glyphs 26, 27, 28, are shown as black. Points outside the glyphs 26, 27, 28, with negative distance values (below a certain threshold) to the respective closest points on the curves defining the edge of the glyphs 26, 27, 28, are shown as white. Points which are close (between the positive and negative thresholds) to the input Bezier curves defining the edge of the glyphs 26, 27, 28, are shown as a shade a grey, depending on their distance from the closest point on the curves.

The thresholds on the signed distance values are such that when the values are stored in a texture, when they are above or below a certain value, only the appropriate (negative or positive) threshold value is stored (or some other default value). This is because, when considering points further away from the curves defining the edge of the glyphs 26, 27, 28 than a certain distance, the exact distance does not matter as it will not be taken into account when generating the render output. The region of interest, and where the exact distance from a sampling point to the closest point on the input curves defining the edge of the glyphs 26, 27, 28 may be used, e.g. to generate particular rendering effects, is for points which lie close to the edge of the glyphs 26, 27, 28. Therefore, for these distance values, between the positive and negative thresholds, the value calculated for the signed distance field is stored without applying a threshold.

Figure 7:
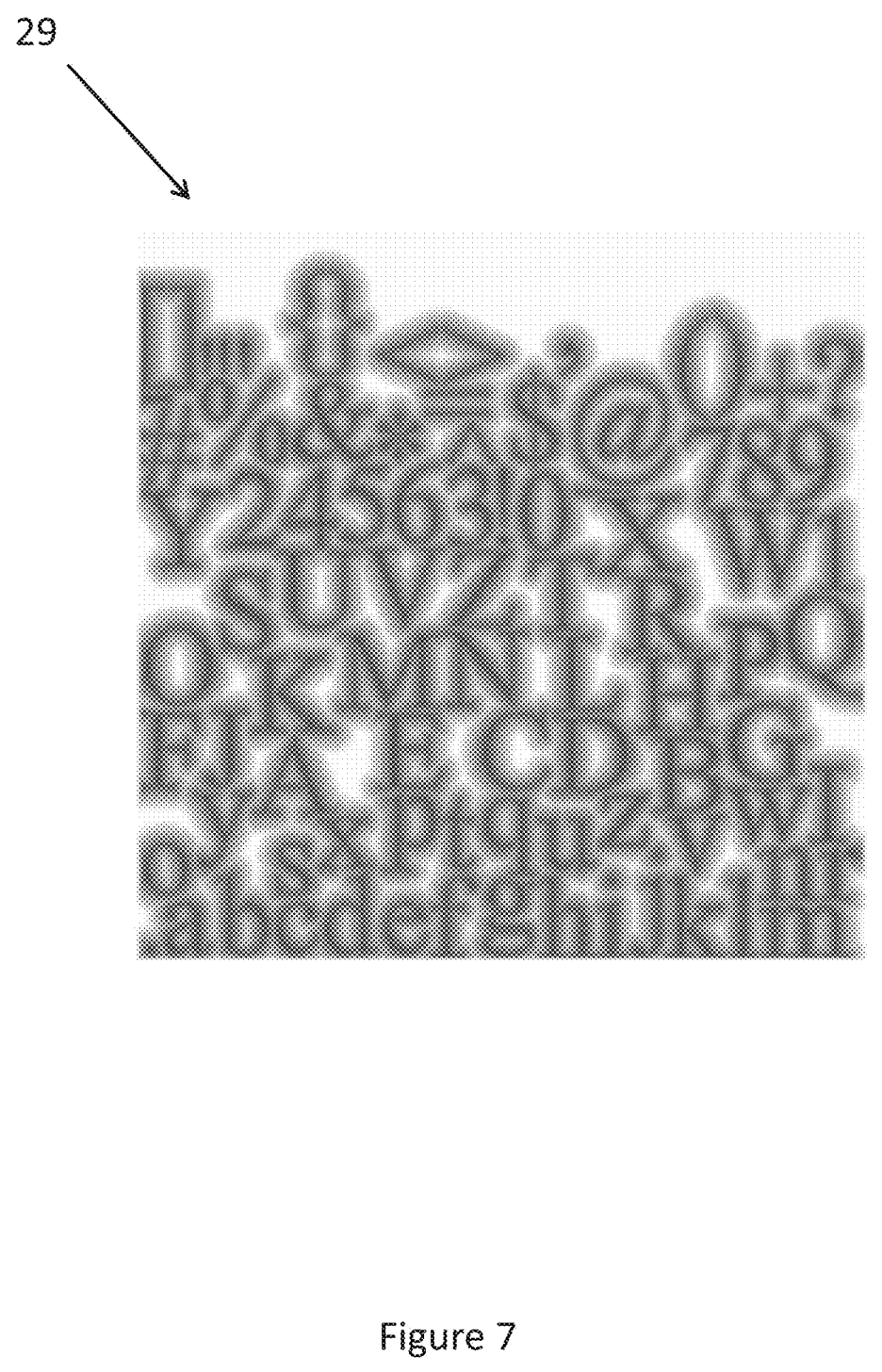

The information to be stored in the texture may be calculated for each of the glyphs (characters) that make up a font, e.g. letters, numbers and punctuation symbols. FIG. 7 shows a graphical representation of the signed distance field for each of the glyphs in a font represented graphically as a texture atlas 29. The texture for each of the glyphs is spatially separated within the texture atlas 29 such that when a particular glyph is required to be rendered, the appropriate area of the texture atlas 29 is sampled. In this example, the texture atlas 29 has been tightly packed to save texture memory, so each glyph has a different size.

Once the signed distance fields have been generated for the glyphs to be rendered (or to produce a full texture atlas as shown in FIG. 7) and stored in a texture, the required glyphs can be rendered, by sampling the texture at an array of sampling points within the bounding box for each glyph, or using the determined signed distance field at the array of sampling points when the signed distance field is calculated in real time as part of the rendering process. This step may use anti-aliasing techniques, using the signed distance field, as shown in Step 3 of FIG. 1, which may then be stored as part of the texture, in a render-to-texture operation.

The final rendered string of text can then be displayed, as shown in the “Result” step of FIG. 1.

The glyphs may be rendered in a “surface” space (i.e. the space in which the render output is generated) which is different to the world space in which the texture for the glyphs is defined, e.g. when writing is to be displayed on a curved surface in three dimensions. In this embodiment, one or more primitives are generated over the scene (display) area in the surface space where the glyph is to be drawn, such that the glyph is covered by the one or more primitives.

These primitives are then rasterised in the normal manner to fragments that are passed to the shading pipeline for shading. (If, as can happen, rasterising the primitives does not generate any fragments (as the primitives do not in fact cover any sampling points of the scene as it will be displayed), then the process can stop here, as this means that the shape will not actually be seen in the scene as it will be displayed.)

The appropriate texture is then applied to the primitive to draw the glyph. This is done by using the texture map (or part of the texture map) that corresponds to the glyph to be drawn to apply the texture to the primitive or primitives by taking texture samples from the texture representing the glyph for the positions of the sampling point or points in the scene that the primitive(s) covers (with an appropriate transformation being performed for the sampling points in the surface space into the world space in which the texture is stored).

Each sampled texture value, including the signed distance to the closest point on the multiple input curves defining the glyph, is then used to determine whether the sample position should be drawn (rendered) as falling inside the glyph (i.e., in practice, inside the edge of the glyph defined by the input curves) or discarded as falling outside the glyph, in dependence on the value of the signed distance.

Figure 8:
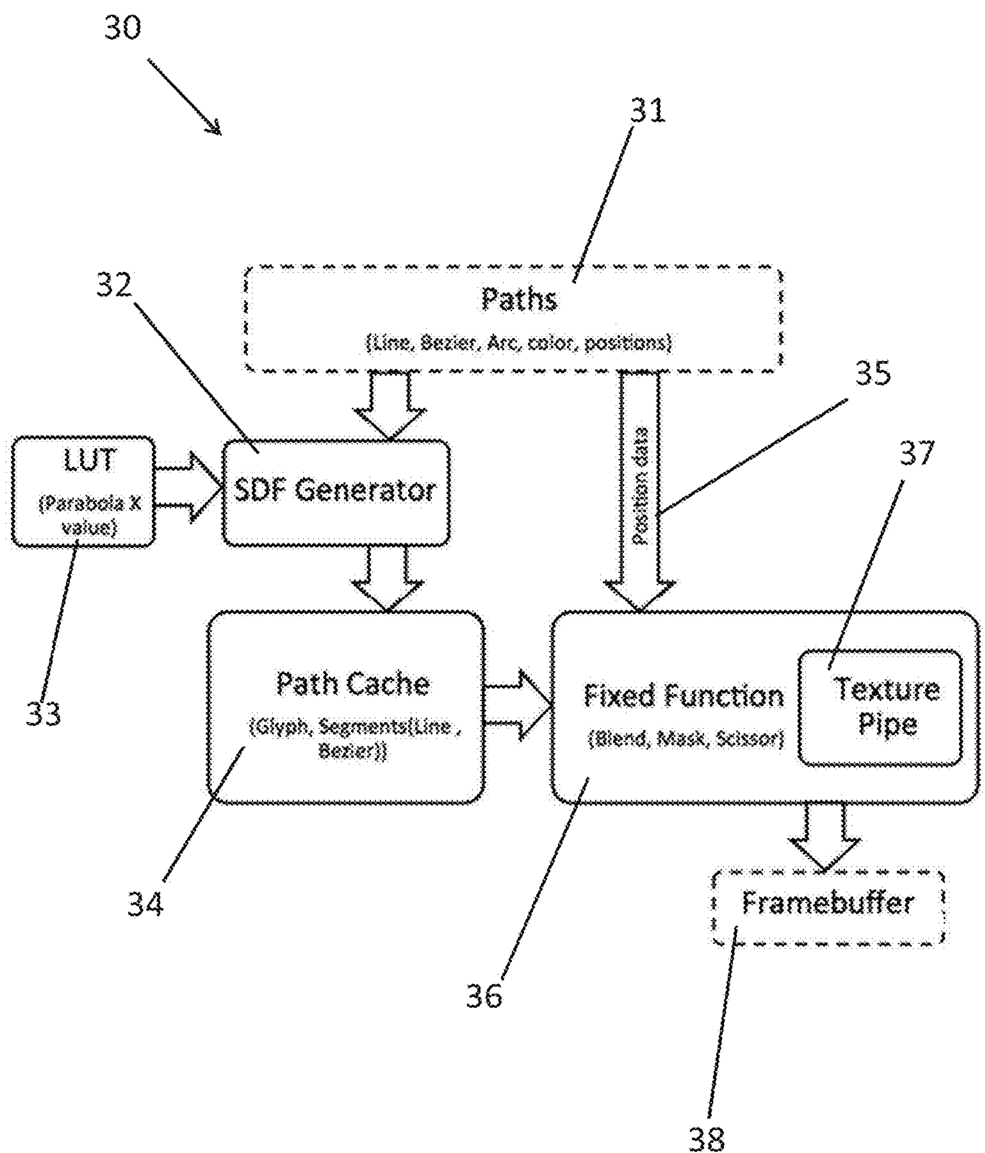
FIG. 8 shows a flow chart for performing the steps of a process for rendering glyphs according to an embodiment of the technology described herein.

FIG. 8 shows a flow chart 30 for performing the steps of the above described process for rendering glyphs according to an embodiment of the technology described herein in a graphics processing pipeline of a graphics processing unit (GPU).

First, pre-defined paths 31, e.g. generated on a central processing unit (CPU), are extracted from font files stored in the CPU. These paths define the glyphs using straight lines, Bezier curves, arcs (e.g. defining the edges of the glyphs), as well as colours and other position data, e.g. defining the start and end points of the input Bezier curves in the world space.

The paths (input curves) are then processed by a processing stage of the graphics processing pipeline (SDF generator) 32 (in the manner described above using a transformation into a canonical space for each of the input curves) to produce a signed distance field for each glyph, using a lookup table (LUT) 33 which returns the distance between the transformed sampling point and the closest point on the canonical curve in the canonical space.

A path cache 34 then stores the signed distance field for the glyph, along with information relating to the paths (input curves), with this information then being combined with the position data 35 in a fixed function unit 36 (which uses a texture pipeline 37 to access the values in the signed distance field) to produce the final texture to render. This may involve one or more of blending, masking and scissor test operations.

The final texture to render is then passed to a frame buffer 38 for output, e.g. display.

It can be seen from the above that using a canonical space to determine the closest point on a canonical curve to a sampling point, e.g. as part of generating a signed distance field, may be an efficient and convenient mechanism for generating a render output using one or more input curves, which allows the mathematical representation of the input curve, e.g. defined using vector graphics, to be retained. This is a simple and accurate way of determining this information, helping to result in a fast and accurate process for generating a render output using an input curve.

A simple process for generating a render output using such input curves, may help to reduce the processing and power load for the device running the process, thus allowing it to be used on simpler devices, e.g. mobile and wearable devices, which are battery operated and may not implement multi-functional processing. In addition the increased efficiency of the process may allow it to perform more sophisticated rendering features, or be able to (re-)calculate the necessary information in real time when needed, without an associated increase in the processing and power load for the device compared to previous techniques.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of generating a render output using an input curve in a graphics processing system comprising:

for an input curve defined in a world space:

determining a portion of a canonical curve defined in a canonical space that corresponds to the input curve and the transformation needed to map the input curve to the portion of the canonical curve;

for each of a plurality of sampling points in the world space surrounding the input curve: transforming the sampling point from the world space to the canonical space using the determined transformation between the world space and the canonical space; and determining, in the canonical space, the closest point on the determined portion of the canonical curve to the transformed sampling point by minimising the distance from the transformed sampling point to the canonical curve;

to thereby determine, for each of the transformed sampling points in the canonical space surrounding the canonical curve, a corresponding closest point on the canonical curve in the canonical space; and using the determined closest points on the canonical curve for the transformed sampling points in the canonical space when generating a render output, thereby using data regarding the canonical curve rather than data for the input curve when generating the render output.

2. The method of claim 1, wherein the step of determining the closest point on the canonical curve comprises determining the distances from the transformed sampling point to the start and the end points of the portion of the canonical curve and determining when one of the start or the end point is the closest point on the canonical curve to the transformed sampling point.

3. The method of claim 1, wherein the step of determining the closest point on the canonical curve comprises determining the distance between the transformed sampling point and the closest point on the canonical curve to the transformed sampling point in the canonical space.

4. The method of claim 3, further comprising storing, for each sampling point, the determined distance from the sampling point to the closest point on the curve.

5. The method of claim 1, further comprising:

for each of the plurality of sampling points surrounding a curve:

determining, using the determined closest point on the curve, on which side of the curve the sampling point should be treated as being;

to thereby determine, for each of the sampling points surrounding the curve, on which side of the curve a sampling point should be treated as being; and using the determinations of on which sides of the curve the sampling points are to be treated as being when generating the render output.

6. A method of generating a render output using a plurality of input curves in a graphics processing system comprising, for each of the input curves defined in a world space:

determining a portion of a canonical curve defined in a canonical space that corresponds to the input curve and the transformation needed to map the input curve to the portion of the canonical curve;

for each of a plurality of sampling points in the world space surrounding the input curve: transforming the sampling point from the world space to the canonical space using the determined transformation between the world space and the canonical space; and determining, in the canonical space, the closest point on the determined portion of the canonical curve to the transformed sampling point;

to thereby determine, for an array of transformed sampling points in the canonical space surrounding each of the plurality of canonical curves, an array of corresponding closest points on each of the plurality of canonical curves in the canonical space for the array of transformed sampling points respectively; and using the array of determined closest points on each of the plurality of canonical curves for the arrays of transformed sampling points in the canonical space when generating a render output, thereby using data regarding the plurality of canonical curves rather than data for the plurality of input curves when generating the render output.

7. A graphics processing system for generating a render output for display using an input curve, the graphics processing system comprising:

processing circuitry capable of, for an input curve defined in a world space: determining a portion of a canonical curve defined in a canonical space that corresponds to the input curve and the transformation needed to map the input curve to the portion of the canonical curve;

for each of a plurality of sampling points in the world space surrounding the input curve:

transforming the sampling point from the world space to the canonical space using the determined transformation between the world space and the canonical space; and determining, in the canonical space, the closest point on the determined portion of the canonical curve to the transformed sampling point by minimising the distance from the transformed sampling point to the canonical curve;

to thereby determine, for each of the transformed sampling points in the canonical space surrounding the canonical curve, a corresponding closest point on the canonical curve in the canonical space; and processing circuitry capable of using the determined closest points on the canonical curve for the transformed sampling points in the canonical space when generating a render output, thereby using data regarding the canonical curve rather than data for the input curve when generating the render output.

8. The graphics processing system of claim 7, wherein to determine the closest point on the canonical curve, the processing circuitry is capable of determining the distances from the transformed sampling point to the start and the end points of the portion of the canonical curve and determining when one of the start or the end point is the closest point on the canonical curve to the transformed sampling point.

9. The graphics processing system of claim 7, wherein to determine the closest point on the canonical curve, the processing circuitry is capable of determining the distance between the transformed sampling point and the closest point on the canonical curve to the transformed sampling point in the canonical space.

10. The graphics processing system of claim 9, wherein the processing circuitry is capable of storing, for each sampling point, the determined distance from the sampling point to the closest point on the curve.

11. The graphics processing system of claim 7, wherein the processing circuitry is capable of:

determining, for each of the plurality of sampling points surrounding a curve, using the determined closest point on the curve, on which side of the curve the sampling point should be treated as being;

to thereby determine, for each of the sampling points surrounding the curve, on which side of the curve a sampling point should be treated as being; and wherein the processing circuitry is capable of using the determinations of on which sides of the curve the sampling points are to be treated as being when generating the render output.

12. A graphics processing system for generating a render output using a plurality of input curves, the graphics processing system comprising processing circuitry capable of:

determining, for each of a plurality of input curves defined in a world space, a portion of a canonical curve defined in a canonical space that corresponds to the input curve and the transformation needed to map the input curve to the portion of the canonical curve;

for each of a plurality of sampling points in the world space surrounding the input curve:

transforming the sampling point from the world space to the canonical space using the determined transformation between the world space and the canonical space; and determining, in the canonical space, the closest point on the determined portion of the canonical curve to the transformed sampling point;

to thereby determine, for an array of transformed sampling points in the canonical space surrounding each of the plurality of canonical curves, an array of corresponding closest points on each of the plurality of canonical curves in the canonical space for the array of transformed sampling points respectively; and using the array of determined closest points on each of the plurality of canonical curves for the arrays of transformed sampling points in the canonical space when generating a render output, thereby using data regarding the plurality of canonical curves rather than data for the plurality of input curves when generating the render output.

13. A non-transitory computer readable storage medium storing computer software code which when executing on a processor performs a method of generating a render output using an input curve in a graphics processing system comprising:

for an input curve defined in a world space:

determining a portion of a canonical curve defined in a canonical space that corresponds to the input curve and the transformation needed to map the input curve to the portion of the canonical curve;

for each of a plurality of sampling points in the world space surrounding the input curve:

transforming the sampling point from the world space to the canonical space using the determined transformation between the world space and the canonical space; and determining, in the canonical space, the closest point on the determined portion of the canonical curve to the transformed sampling point by minimising the distance from the transformed sampling point to the canonical curve;

to thereby determine, for each of the transformed sampling points in the canonical space surrounding the canonical curve, a corresponding closest point on the canonical curve in the canonical space; and using the determined closest points on the canonical curve for the transformed sampling points in the canonical space when generating a render output, thereby using data regarding the canonical curve rather than data for the input curve when generating the render output.

14. A non-transitory computer readable storage medium storing computer software code which when executing on a processor performs a method of generating a render output using a plurality of input curves in a graphics processing system comprising, for each of the input curves defined in a world space:

determining a portion of a canonical curve defined in a canonical space that corresponds to the input curve and the transformation needed to map the input curve to the portion of the canonical curve;

for each of a plurality of sampling points in the world space surrounding the input curve:

transforming the sampling point from the world space to the canonical space using the determined transformation between the world space and the canonical space; and to thereby determine, for an array of transformed sampling points in the canonical space surrounding each of the plurality of canonical curves, an array of corresponding closest points on each of the plurality of canonical curves in the canonical space for the array of transformed sampling points respectively; and using the array of determined closest points on each of the plurality of canonical curves for the arrays of transformed sampling points in the canonical space when generating a render output, thereby using data regarding the plurality of canonical curves rather than data for the plurality of input curves when generating the render output.

* * * * *